(12) United States Patent
Yi et al.

(10) Patent No.: US 10,164,799 B2
(45) Date of Patent: Dec. 25, 2018

(54) METHOD, APPARATUS, AND SYSTEM FOR CORRECTING CHANNEL OF REMOTE RADIO UNIT

(71) Applicant: Huawei Technologies Co., Ltd., Shenzhen (CN)

(72) Inventors: Xiongshu Yi, Chengdu (CN); Chaochao Zhang, Chengdu (CN); Lu Guan, Chengdu (CN); Yun Liu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 226 days.

(21) Appl. No.: 15/068,502

(22) Filed: Mar. 11, 2016

(65) Prior Publication Data

US 2016/0197745 A1     Jul. 7, 2016

Related U.S. Application Data

(63) Continuation of application No. PCT/CN2014/086480, filed on Sep. 15, 2014.

(30) Foreign Application Priority Data

Sep. 13, 2013 (CN) .......................... 2013 1 0419696

(51) Int. Cl.
*H04L 25/02* (2006.01)
*H04L 25/03* (2006.01)
(Continued)

(52) U.S. Cl.
CPC ....... *H04L 25/0204* (2013.01); *H04B 7/0413* (2013.01); *H04J 11/00* (2013.01);
(Continued)

(58) Field of Classification Search
CPC ............. H04L 25/0204; H04L 25/0224; H04L 25/03343; H04L 5/12; H04B 7/0413;
(Continued)

(56) References Cited

U.S. PATENT DOCUMENTS 6,144,711 A * 11/2000 Raleigh ................ H04B 7/0615
375/346
6,895,230 B1 * 5/2005 Blount ................... H04B 7/084
342/174

(Continued)

FOREIGN PATENT DOCUMENTS

CN      101621842 A      1/2010
CN      102315868 A      1/2012
(Continued)

OTHER PUBLICATIONS

R1-081330, was presented at 3GPP TSG RAN WG1 meeting #52 bis, Shenzhen, China, Mar. 31-Apr. 4, 2008 as Agenda Item: 6.3.4; titled, "On antenna calibration of LTE, Document for: Discussion and Decision".*

(Continued)

*Primary Examiner* — Andrew Lai
*Assistant Examiner* — Hoyet H Andrews, III
(74) *Attorney, Agent, or Firm* — Leydig, Voit & Mayer, Ltd.

(57) ABSTRACT

The present disclosure relates to a remote radio unit (RRU), which is connected to a baseband unit (BBU) and an antenna, comprising: a service transmit channel configured to transmit a first correction signal through the antenna, and a standing wave detecting circuit associated with the service transmit channel, wherein: a working frequency of the standing wave detecting circuit is consistent with the service transmit channel, and the standing wave detecting circuit is capable of detecting a standing wave ratio of the service (Continued)

transmit channel and is configured to receive a correction signal looped back by the antenna, and send the correction signal looped back by the antenna to the BBU, wherein the correction signal looped back by the antenna comprises a portion of the first correction signal reflected by the antenna and is used for a calculation of a correction coefficient of the service transmit channel.

15 Claims, 9 Drawing Sheets

(51) Int. Cl.
*H04B 7/0413* (2017.01)
*H04J 11/00* (2006.01)
*H04L 5/12* (2006.01)
*H04W 16/18* (2009.01)
*H04W 72/04* (2009.01)
*H04W 88/02* (2009.01)

(52) U.S. Cl.
CPC ............ *H04L 5/12* (2013.01); *H04L 25/0224* (2013.01); *H04L 25/03343* (2013.01); *H04W 16/18* (2013.01); *H04W 72/042* (2013.01); *H04W 88/02* (2013.01)

(58) Field of Classification Search
CPC ..... H04J 11/00; H04W 16/18; H04W 72/042; H04W 88/02
See application file for complete search history.

(56) References Cited

U.S. PATENT DOCUMENTS

| | | | |
|---|---|---|---|
| 2005/0227628 A1 | 10/2005 | Inanoglu | |
| 2006/0094435 A1* | 5/2006 | Thomas | H04B 7/0669 455/450 |
| 2006/0098580 A1* | 5/2006 | Li | H04B 7/0408 370/245 |
| 2006/0116076 A1* | 6/2006 | Li | H04B 7/0626 455/41.2 |
| 2006/0120476 A1* | 6/2006 | Li | H04B 7/0421 375/267 |
| 2006/0146725 A1* | 7/2006 | Li | H04B 7/0617 370/252 |
| 2006/0165191 A1* | 7/2006 | Lin | H04B 7/0417 375/267 |
| 2006/0234645 A1* | 10/2006 | Lin | H04B 7/0421 455/69 |
| 2007/0064665 A1* | 3/2007 | Zhang | H04L 5/006 370/343 |
| 2007/0206686 A1* | 9/2007 | Vook | H04B 7/0671 375/260 |
| 2007/0230373 A1* | 10/2007 | Li | H04B 7/0447 370/267 |
| 2007/0286303 A1* | 12/2007 | Yamaura | H04B 7/0421 375/267 |
| 2007/0293172 A1* | 12/2007 | Shi | H04B 7/0634 455/187.1 |
| 2008/0199183 A1* | 8/2008 | Liu | H04J 3/1617 398/103 |
| 2009/0003308 A1* | 1/2009 | Baxley | H04B 1/59 370/350 |
| 2009/0080504 A1* | 3/2009 | Li | H04B 7/0421 375/220 |
| 2011/0150113 A1* | 6/2011 | Oyman | H04L 1/0019 375/260 |
| 2011/0212743 A1* | 9/2011 | Yokomakura | H04L 5/0026 455/509 |
| 2012/0208584 A1 | 8/2012 | Liao | |
| 2013/0084845 A1* | 4/2013 | Kimura | H04W 52/0216 455/418 |
| 2013/0310023 A1* | 11/2013 | Bevan | H04B 1/1027 455/423 |
| 2014/0226511 A1* | 8/2014 | Gotman | H04L 1/0026 370/252 |
| 2015/0009951 A1* | 1/2015 | Josiam | H04L 25/0224 370/330 |
| 2015/0189669 A1 | 7/2015 | Huang et al. | |
| 2016/0329631 A1* | 11/2016 | Rheinfelder | H01Q 1/246 |

FOREIGN PATENT DOCUMENTS

| | | | | |
|---|---|---|---|---|
| CN | 102891708 A | | 1/2013 | |
| WO | WO 2011098020 A1 | * | 8/2011 | ........... H04B 1/0466 |
| WO | WO-2011098020 A1 | * | 8/2011 | ........... H04B 1/0466 |
| WO | WO 2013056398 A1 | | 4/2013 | |

OTHER PUBLICATIONS

"On antenna calibration of LTE," 3GPP TSG RAN WG1 meeting #52 bis, R1-081330, Shenzhen, China, 3$^{rd}$ Generation Partnership Project, Valbonne, France (Mar. 31-Apr. 4, 2008).

* cited by examiner

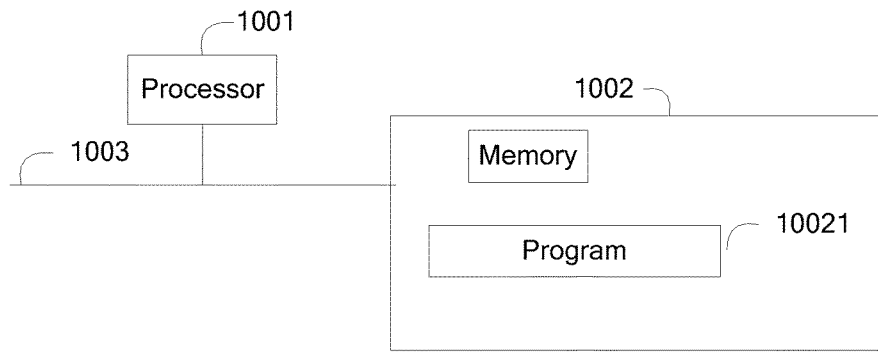

FIG. 10

| Each service transmit channel of a first remote radio unit RRU transmits a correction signal, where the correction signal is sent by a baseband unit BBU to the first remote radio unit RRU | — S1101 |

| A standing wave detecting channel of the first remote radio unit RRU receives a correction signal looped back by using an antenna, and sends, to the baseband unit BBU, the correction signal looped back by the antenna, so that the baseband unit BBU calculates a correction coefficient of each service transmit channel according to the correction signal looped back by the antenna and separately performs channel correction on each service transmit channel, where the correction signal looped back by the antenna includes at least a correction signal that is transmitted over each service transmit channel of the first remote radio unit RRU and looped back by the antenna | — S1102 |

FIG. 11

METHOD, APPARATUS, AND SYSTEM FOR CORRECTING CHANNEL OF REMOTE RADIO UNIT

CROSS-REFERENCE TO RELATED APPLICATIONS

This application is a continuation of International Patent Application No. PCT/CN2014/086480, filed on Sep. 15, 2014, which claims priority to Chinese Patent Application No. 201310419696.7, filed on Sep. 13, 2013, both of which are incorporated herein by reference in their entireties.

TECHNICAL FIELD

The present disclosure relates to the field of communications technologies, and in particular, to a method, apparatus, and system for correcting a channel of a remote radio unit.

BACKGROUND

In an LTE (Long Term Evolution) system, the CL-MIMO (closed-loop multiple-input multiple-output) technology is introduced. In the CL-MIMO, a terminal performs measurement on a channel state, and selects, according to a criterion, a PMI codebook most matching the channel from a given PMI (precoding matrix indication) codebook set and reports the PMI codebook to a base station. The base station selects a corresponding precoding matrix according to the PMI codebook reported by the terminal to perform weighting on downlink transmit data, so as to obtain an array gain of a transmit end. In the CL-MIMO, if different delay differences exist between channels of a transmit end RRU (Remote Radio Unit, remote radio unit), system performance deteriorates seriously. Therefore, to improve the system performance, channel correction of the RRU needs to be performed.

In the CL-MIMO, the transmit end may use a 2T2R (that is, two transmit channels and two receive channels) structure or a 4T4R (that is, four transmit channels and four receive channels) structure. In the existing LTE system, the 2T2R structure is mostly used. To improve the system performance and configure the system with the 4T4R structure, two feasible implementation manners exist: One implementation manner is that a new RRU with 4T4R is directly used to replace an existing 2T2R RRU; and the other implementation manner is that two existing 2T2R RRUs are combined into one RRU that has a 4T4R function. For the first implementation manner, direct replacement of the existing RRU causes an increase of costs and a waste of resources; and for the second implementation manner, because channels of different RRUs have relatively large delay differences, the system performance degrades. Therefore, joint channel correction needs to be performed on the two combined RRUs to keep the delay differences between channels of different RRUs consistent.

A method for joint channel correction between RRUs exists in the prior art and is applied to a TDD (time division duplex) system. As shown in FIG. 1, FIG. 1 is a schematic diagram of an existing method for correcting a channel of a combined RRU in a TDD system. In this method, an RRU0 and an RRU1 first complete self-correction, then the RRU0 and the RRU1 transmit a correction signal through a service transmit channel of one RRU of the RRU0 and the RRU1, a service receive channel of the RRU receives a correction signal looped back by an antenna, and joint channel correction of the RRU0 and the RRU1 is implemented by using the looped back correction signal.

In a process of implementing embodiments of the present disclosure, the inventor finds that at least the following defect exists in the prior art: The method for joint channel correction between RRUs provided in the prior art can be applicable only to the TDD system, and is not applicable to joint correction of RRUs in an FDD (frequency division duplex) system. This is because in the FDD system, a working frequency of a service transmit channel is not consistent with a working frequency of a service receive channel, a correction signal transmitted by the service transmit channel cannot be received by the service receive channel, and therefore, the foregoing method cannot be applied to channel correction between RRUs in the FDD system. In the prior art, a method for correcting a channel of a 2T2R RRU in an FDD mode does not exist. In this case, for a combined RRU, delay consistency among RRU channels cannot be ensured, thereby affecting the system performance.

SUMMARY

To resolve the foregoing technical problem, embodiments of the present disclosure provide a method, apparatus, and system for correcting a channel of a remote radio unit, so that correction between channels of the remote radio unit in an FDD mode can be implemented to keep delay consistency between the channels of the remote radio unit, thereby improving system performance.

The technical solutions are as follows:

According to a first aspect of the embodiments of the present disclosure, a first remote radio unit RRU is disclosed, where the first remote radio unit RRU is applied to a base station, the base station further includes a baseband unit BBU, and the first remote radio unit RRU has a communication connection to the baseband unit BBU; and the first remote radio unit RRU includes a service transmit channel and at least one standing wave detecting channel, and a working frequency of the service transmit channel is the same as a working frequency of the standing wave detecting channel, where:

the service transmit channel is configured to transmit a correction signal, where the correction signal is sent by the baseband unit BBU to the first remote radio unit RRU; and the standing wave detecting channel is configured to receive a correction signal looped back by an antenna, and send, to the baseband unit BBU, the correction signal looped back by the antenna, so that the baseband unit BBU calculates a correction coefficient of each service transmit channel according to the correction signal looped back by the antenna and performs channel correction on each service transmit channel, where the correction signal looped back by the antenna includes at least a correction signal that is transmitted over each service transmit channel of the first remote radio unit RRU and looped back by the antenna.

With reference to the first aspect of the present disclosure, the present disclosure also has a first possibility, where the baseband unit BBU also has a communication connection to a second remote radio unit RRU, and the second remote radio unit RRU includes a service transmit channel, where the service transmit channel is configured to transmit a correction signal, and the correction signal is sent by the baseband unit BBU to the second remote radio unit RRU;

the correction signal looped back by the antenna further includes a correction signal that is transmitted over each service transmit channel of the second remote radio unit RRU and looped back by the antenna; and the standing wave detecting channel is configured to:

receive the correction signal that is transmitted over each service transmit channel of the first remote radio unit RRU and looped back by the antenna and the correction signal that is transmitted over each service transmit channel of the second remote radio unit RRU and looped back by the antenna, and send, to the baseband unit BBU, the correction signal that is transmitted over each service transmit channel of the first remote radio unit RRU and looped back by the antenna and the correction signal that is transmitted over each service transmit channel of the second remote radio unit RRU and looped back by the antenna, so that the baseband unit BBU calculates a correction coefficient of each service transmit channel according to the correction signal that is transmitted over each service transmit channel of the second remote radio unit RRU and looped back by the antenna and the correction signal that is transmitted over each service transmit channel of the first remote radio unit RRU and looped back by the antenna, and separately performs the channel correction on each service transmit channel.

According to a second aspect of the embodiments of the present disclosure, a baseband unit BBU is disclosed, where the baseband unit BBU is applied to a base station, the baseband unit BBU has a communication connection to at least one remote radio unit, the at least one remote radio unit has at least one standing wave detecting channel and a service transmit channel, and a working frequency of the standing wave detecting channel is the same as a working frequency of the service transmit channel; and the baseband unit BBU includes:

a sending unit, configured to send a correction signal to the remote radio unit RRU that has the communication connection to the baseband unit BBU;

a receiving unit, configured to receive a correction signal that is transmitted over each service transmit channel of the remote radio unit RRU, looped back by an antenna, and fed by the standing wave detecting channel; and a first correcting unit, configured to calculate a correction coefficient of each service transmit channel according to the correction signal that is transmitted over each service transmit channel of the remote radio unit RRU, looped back by the antenna, and received by the receiving unit, and separately perform channel correction on each service transmit channel.

With reference to the second aspect of the present disclosure, the present disclosure also has a second possibility, where the baseband unit BBU has a communication connection to at least two remote radio units, and at least one remote radio unit of the at least two remote radio units has a standing wave detecting channel.

With reference to the second aspect of the present disclosure, the present disclosure also has a third possibility, where the first correcting unit is further configured to:

when it is determined that quality of a first group of correction signals that are looped back by the antenna and received by the receiving unit is not reliable, acquire a second group of correction signals looped back by the antenna, and calculate the correction coefficient of each service transmit channel by using the acquired first group of correction signals looped back by the antenna and the acquired second group of correction signals looped back by the antenna, so as to perform the channel correction on each service transmit channel.

With reference to the second aspect of the present disclosure and the third possibility of the present disclosure, the present disclosure also has a fourth possibility, where, when the remote radio unit connected to the baseband unit BBU has only one standing wave detecting channel, the sending unit is further configured to:

when the first correcting unit determines that the quality of the first group of correction signals that are looped back by the antenna and received by the receiving unit is not reliable, send a second group of correction signals to the remote radio unit RRU that has the communication connection to the baseband unit BBU; and when the first correcting unit acquires the second group of correction signals looped back by the antenna, the first correcting unit is configured to:

acquire, by the first correcting unit, the second group of correction signals that are sent in the remote radio unit RRU, looped back by the antenna, and received by the receiving unit, and calculate the correction coefficient of each service transmit channel by using the acquired first group of correction signals looped back by the antenna and the acquired second group of correction signals looped back by the antenna, so as to perform the channel correction on each service transmit channel.

With reference to the second aspect of the present disclosure and the third possibility and the fourth possibility of the present disclosure, the present disclosure also has a fifth possibility, where, when the first correcting unit calculates the correction coefficient of the service transmit channel by using the acquired first group of correction signals looped back by the antenna and the acquired second group of correction signals looped back by the antenna, the first correcting unit is configured to:

acquire a first channel set according to the first group of correction signals looped back by the antenna, where the first channel set includes a service transmit channel on which the channel correction is performed by using the first group of correction signals looped back by the antenna and the correction is successful; acquire a second channel set according to the second group of correction signals looped back by the antenna, where the second channel set includes a service transmit channel on which the channel correction is performed by using the second group of correction signals looped back by the antenna and the correction is successful; and acquire an intersection set of the first channel set and the second channel set, and acquire, by using a correction coefficient corresponding to any service transmit channel in the intersection set, a correction coefficient of a service transmit channel corresponding to a correction signal whose signal quality is not reliable, so as to obtain correction coefficients of all service transmit channels.

With reference to the second aspect of the present disclosure, the present disclosure also has a sixth possibility, where, when the first correcting unit calculates the correction coefficient of the service transmit channel according to the correction signal that is transmitted over the service transmit channel of the remote radio unit RRU, looped back by the antenna, and received by the receiving unit, and performs the channel correction on the service transmit channel, the first correcting unit is configured to:

perform channel estimation on each service transmit channel according to a correction signal that is transmitted over each service transmit channel of the remote radio unit RRU, looped back by the antenna, and received by the receiving unit to obtain a channel response value of each service transmit channel;

obtain a delay difference between each service transmit channel and a reference transmit channel according to the channel response value of each service transmit channel, where the reference transmit channel is one service transmit channel of all service transmit channels; and obtain a correction coefficient by using the obtained delay difference, and perform channel compensation on each service transmit channel by using the correction coefficient.

With reference to the second aspect of the present disclosure and the sixth possibility of the present disclosure, the present disclosure also has a seventh possibility, where, when the first correcting unit obtains the delay difference between each service transmit channel and the reference transmit channel according to the channel response value of each service transmit channel, the first correcting unit is configured to:

obtain a phase difference between each service transmit channel and the reference transmit channel by using the channel response value of each service transmit channel, and obtain the delay difference between each service transmit channel and the reference transmit channel by using the acquired phase difference;

or the first correcting unit is configured to transform the channel response value of each service transmit channel to a time domain, and separately obtain a time domain sample point corresponding to a maximum modulus value of the response value of each service transmit channel and use the time domain sample point as a delay of the service transmit channel, so as to obtain the delay difference between each service transmit channel and the reference transmit channel.

According to a third aspect of the present disclosure, a baseband unit BBU is disclosed, where the baseband unit BBU is applied to a base station, the baseband unit BBU has a communication connection to at least one remote radio unit, and the at least one remote radio unit has a service transmit channel and at least one correction signal receive channel; and the baseband unit BBU includes:

a sending unit, configured to send a correction signal to the remote radio unit RRU that has the communication connection to the baseband unit BBU;

a receiving unit, configured to receive a correction signal that is transmitted over each service transmit channel of the remote radio unit RRU, looped back by an antenna, and fed by the correction signal receive channel; and a second correcting unit, configured to calculate a correction coefficient according to the correction signal that is transmitted over each service transmit channel of the remote radio unit RRU, looped back by the antenna, and received by the receiving unit; and when it is determined that quality of a first group of correction signals that are looped back by the antenna and received by the receiving unit is not reliable, acquire a second group of correction signals looped back by the antenna, and calculate the correction coefficient of each service transmit channel by using the acquired first group of correction signals looped back by the antenna and the acquired second group of correction signals looped back by the antenna, so as to perform channel correction on each service transmit channel.

With reference to the third aspect of the present disclosure, the present disclosure also has an eighth possibility, where, when the baseband unit BBU is applied to a frequency division duplex transmission mode, the at least one correction signal receive channel included in the remote radio unit that has a communication connection to the baseband unit BBU is a standing wave detecting channel, a working frequency of the standing wave detecting channel is the same as a working frequency of the service transmit channel of the remote radio unit RRU, and the receiving unit is configured to:

receive a correction signal that is transmitted over each service transmit channel of the remote radio unit RRU, looped back by the antenna, and fed by the standing wave detecting channel.

With reference to the third aspect of the present disclosure, the present disclosure also has a ninth possibility, where, when the baseband unit BBU is applied to a frequency division duplex transmission mode, the at least one correction signal receive channel included in the remote radio unit that has a communication connection to the baseband unit BBU is a correction receive channel, a working frequency of the correction receive channel is the same as a working frequency of the service transmit channel of the remote radio unit RRU, the correction receive channel is different from a service receive channel, and the receiving unit is configured to:

receive a correction signal that is transmitted over each service transmit channel of the remote radio unit RRU, looped back by the antenna, and fed by the correction receive channel.

With reference to the third aspect of the present disclosure, the present disclosure also has a tenth possibility, where, when the baseband unit BBU is applied to a time division duplex transmission mode, the at least one correction signal receive channel included in the remote radio unit that has a communication connection to the baseband unit BBU is a service receive channel, and the receiving unit is configured to:

receive a correction signal that is transmitted over each service transmit channel of the remote radio unit RRU, looped back by the antenna, and fed by the service receive channel.

According to a fourth aspect of the present disclosure, a base station is disclosed, where the base station includes a baseband unit BBU and at least one remote radio unit RRU, the remote radio unit RRU has a communication connection to the baseband unit BBU, the remote radio unit RRU includes a service transmit channel and at least one standing wave detecting channel, and a working frequency of the service transmit channel is the same as a working frequency of the standing wave detecting channel, where the baseband unit is configured to send a correction signal to the remote radio unit RRU that has the communication connection to the baseband unit BBU; receive a correction signal that is transmitted over each service transmit channel of the remote radio unit RRU, looped back by an antenna, and fed by the standing wave detecting channel; and calculate a correction coefficient of each service transmit channel according to the received correction signal that is transmitted over each service transmit channel of the remote radio unit RRU and looped back by the antenna, and separately perform channel correction on each service transmit channel; and the remote radio unit RRU is configured to transmit, through the service transmit channel, the correction signal sent by the baseband unit; and receive the correction signal looped back by the antenna, and send, to the baseband unit BBU, the correction signal looped back by the antenna.

According to a fifth aspect of the present disclosure, a base station is disclosed, where the base station includes a baseband unit BBU and at least two remote radio units RRUs, the at least two remote radio units RRUs include a first remote radio unit and a second remote radio unit, the first remote radio unit has at least one standing wave detecting channel, and a working frequency of the standing wave detecting channel is the same as a working frequency of each service transmit channel of the at least two remote radio units, where the baseband unit is configured to send a correction signal to the first remote radio unit and the second remote radio unit that have a communication connection to the baseband unit BBU; and receive a correction signal that is transmitted over each service transmit channel of the first remote radio unit RRU, looped back by an antenna, and fed by the standing wave detecting channel and a correction signal that is transmitted over each service transmit channel of the second remote radio unit RRU, looped back by the antenna, and fed by the standing wave detecting channel, calculate a correction coefficient of each service transmit channel according to the correction signal that is transmitted over each service transmit channel of the second remote radio unit RRU and looped back by the antenna and the correction signal that is transmitted over each service transmit channel of the first remote radio unit RRU and looped back by the antenna, and separately perform channel correction on each service transmit channel;

the first remote radio unit is configured to transmit, through the service transmit channel, the correction signal sent by the baseband unit; and receive, through the standing wave detecting channel, correction signals looped back by the antenna, and send, to the baseband unit BBU, the correction signals looped back by the antenna, where the correction signals looped back by the antenna include the correction signal that is transmitted over each service transmit channel of the first remote radio unit RRU and looped back by the antenna and the correction signal that is transmitted over each service transmit channel of the second remote radio unit RRU and looped back by the antenna; and the second remote radio unit is configured to transmit, through the service transmit channel, the correction signal sent by the baseband unit.

With reference to the fifth aspect of the present disclosure, the present disclosure also has an eleventh possibility, where the second remote radio unit has at least one standing wave detecting channel, and the second remote radio unit is further configured to:

receive, through the standing wave detecting channel, the correction signals looped back by the antenna, and send, to the baseband unit BBU, the correction signals looped back by the antenna, where the correction signals looped back by the antenna include the correction signal that is transmitted over each service transmit channel of the first remote radio unit RRU and looped back by the antenna and the correction signal that is transmitted over each service transmit channel of the second remote radio unit RRU and looped back by the antenna.

According to a sixth aspect of the present disclosure, a method for correcting a channel of a remote radio unit is disclosed, where the method is applied to a first remote radio unit RRU, the first remote radio unit RRU has a communication connection to a baseband unit BBU, the first remote radio unit RRU includes a service transmit channel and at least one standing wave detecting channel, a working frequency of the service transmit channel is the same as a working frequency of the standing wave detecting channel, and the method includes:

transmitting, by each service transmit channel of the first remote radio unit RRU, a correction signal, where the correction signal is sent by the baseband unit BBU to the first remote radio unit RRU; and receiving, by the standing wave detecting channel of the first remote radio unit RRU, a correction signal looped back by an antenna, and sending, to the baseband unit BBU, the correction signal looped back by the antenna, so that the baseband unit BBU calculates a correction coefficient of each service transmit channel according to the correction signal looped back by the antenna and performs channel correction on each service transmit channel, where the correction signal looped back by the antenna includes at least a correction signal that is transmitted over each service transmit channel of the first remote radio unit RRU and looped back by the antenna.

With reference to the sixth aspect of the present disclosure, the present disclosure also has a twelfth possibility, where the baseband unit BBU also has a communication connection to a second remote radio unit RRU, and the second remote radio unit RRU includes a service transmit channel, where the service transmit channel is configured to transmit a correction signal, and the correction signal is sent by the baseband unit BBU to the second remote radio unit RRU; and the receiving, by the standing wave detecting channel of the first remote radio unit RRU, a correction signal looped back by an antenna, and sending, to the baseband unit BBU, the correction signal looped back by the antenna, so that the baseband unit BBU calculates a correction coefficient of each service transmit channel according to the correction signal looped back by the antenna and performs channel correction on each service transmit channel is:

receiving, by the standing wave detecting channel of the first remote radio unit RRU, the correction signal that is transmitted over each service transmit channel of the first remote radio unit RRU and looped back by the antenna and a correction signal that is transmitted over each service transmit channel of the second remote radio unit RRU and looped back by the antenna, and sending, to the baseband unit BBU, the correction signal that is transmitted over each service transmit channel of the first remote radio unit RRU and looped back by the antenna and the correction signal that is transmitted over each service transmit channel of the second remote radio unit RRU and looped back by the antenna, so that the baseband unit BBU calculates a correction coefficient of each service transmit channel according to the correction signal that is transmitted over each service transmit channel of the second remote radio unit RRU and looped back by the antenna and the correction signal that is transmitted over each service transmit channel of the first remote radio unit RRU and looped back by the antenna, and separately performs the channel correction on each service transmit channel.

According to a seventh aspect of the present disclosure, a method for correcting a channel of a remote radio unit is disclosed, where the method is applied to a baseband unit BBU, the baseband unit BBU has a communication connection to at least one remote radio unit, the at least one remote radio unit has at least one standing wave detecting channel and a service transmit channel, a working frequency of the standing wave detecting channel is the same as a working frequency of the service transmit channel, and the method includes:

sending, by the baseband unit BBU, a correction signal to the remote radio unit RRU that has the communication connection to the baseband unit BBU;

receiving, by the baseband unit BBU, a correction signal that is transmitted over each service transmit channel of the remote radio unit RRU, looped back by an antenna, and fed by the standing wave detecting channel; and calculating, by the baseband unit BBU, a correction coefficient of each service transmit channel according to the received correction signal that is transmitted over each service transmit channel of the remote radio unit RRU and looped back by the antenna, and separately performing channel correction on each service transmit channel.

With reference to the seventh aspect of the present disclosure, the present disclosure also has a thirteenth possibility, where the baseband unit BBU has a communication connection to at least two remote radio units, and at least one remote radio unit of the at least two remote radio units has a standing wave detecting channel.

With reference to the seventh aspect of the present disclosure, the present disclosure also has a fourteenth possibility, where the method further includes:

when it is determined that quality of a first group of received correction signals looped back by the antenna is not reliable, acquiring a second group of correction signals looped back by the antenna, and calculating the correction coefficient of each service transmit channel by using the acquired first group of correction signals looped back by the antenna and the acquired second group of correction signals looped back by the antenna, so as to perform the channel correction on each service transmit channel.

With reference to the seventh aspect of the present disclosure, the present disclosure also has a fifteenth possibility, where, when the remote radio unit connected to the baseband unit BBU has only one standing wave detecting channel, the method further includes:

when it is determined that quality of a first group of correction signals that are looped back by the antenna and received by a receiving unit is not reliable, sending a second group of correction signals to the remote radio unit RRU that has the communication connection to the baseband unit BBU; and the acquiring a second group of correction signals looped back by the antenna includes:

acquiring the second group of received correction signals that are sent in the remote radio unit RRU and looped back by the antenna, and using the second group of received correction signals as the second group of correction signals looped back by the antenna.

With reference to seventh aspect of the present disclosure, the fourteenth possibility of the present disclosure, and the fifteenth possibility of the present disclosure, the present disclosure also has a sixteenth possibility, where the calculating the correction coefficient of each service transmit channel by using the acquired first group of correction signals looped back by the antenna and the acquired second group of correction signals looped back by the antenna includes:

acquiring a first channel set according to the first group of correction signals looped back by the antenna, where the first channel set includes a service transmit channel on which the channel correction is performed by using the first group of correction signals looped back by the antenna and the correction is successful; acquiring a second channel set according to the second group of correction signals looped back by the antenna, where the second channel set includes a service transmit channel on which the channel correction is performed by using the second group of correction signals looped back by the antenna and the correction is successful; and acquiring an intersection set of the first channel set and the second channel set, acquiring, by using a correction coefficient corresponding to any service transmit channel in the intersection set, a correction coefficient of a service transmit channel corresponding to a correction signal whose signal quality is not reliable, so as to obtain correction coefficients of all service transmit channels, and performing the channel correction on each service transmit channel by using the obtained correction coefficients of all service transmit channels.

With reference to the seventh aspect of the present disclosure, the present disclosure also has a seventeenth possibility, where the calculating a correction coefficient of each service transmit channel according to the received correction signal that is transmitted over each service transmit channel of the remote radio unit RRU and looped back by the antenna, and separately performing channel correction on each service transmit channel includes:

performing channel estimation on each service transmit channel according to the received correction signal that is transmitted over each service transmit channel of the remote radio unit RRU and looped back by the antenna to obtain a channel response value of each service transmit channel;

obtaining a delay difference between each service transmit channel and a reference transmit channel according to the channel response value of each service transmit channel, where the reference transmit channel is one service transmit channel of all service transmit channels, and the service transmit channel meets a preset condition; and obtaining a correction coefficient by using the obtained delay difference, and performing channel compensation on each service transmit channel by using the correction coefficient.

With reference to the seventh aspect of the present disclosure and the seventeenth possibility of the present disclosure, the present disclosure also has an eighteenth possibility, where the obtaining a delay difference between each service transmit channel and a reference transmit channel according to the channel response value of each service transmit channel includes:

obtaining a phase difference between each service transmit channel and the reference transmit channel by using the channel response value of each service transmit channel, and obtaining the delay difference between each service transmit channel and the reference transmit channel by using the acquired phase difference;

or transforming the channel response value of each service transmit channel to a time domain, and separately obtaining a time domain sample point corresponding to a maximum modulus value of the response value of each service transmit channel and using the time domain sample point as a delay of the service transmit channel, so as to obtain the delay difference between each service transmit channel and the reference transmit channel.

According to an eighth aspect of the embodiments of the present disclosure, a method for correcting a channel of a remote radio unit is disclosed, where the method is applied to a baseband unit BBU, the baseband unit BBU is applied to a base station, the baseband unit BBU has a communication connection to at least one remote radio unit, the at least one remote radio unit has a service transmit channel and at least one correction signal receive channel, and the method includes:

sending a correction signal to the remote radio unit RRU that has the communication connection to the baseband unit BBU;

receiving a correction signal that is transmitted over each service transmit channel of the remote radio unit RRU, looped back by an antenna, and fed by the correction signal receive channel; and according to the correction signal that is transmitted over each service transmit channel of the remote radio unit RRU, looped back by the antenna, and received by a receiving unit, and when it is determined that quality of a first group of correction signals that are looped back by the antenna and received by the receiving unit is not reliable, acquiring a second group of correction signals looped back by the antenna, and calculating a correction coefficient of each service transmit channel by using the acquired first group of correction signals looped back by the antenna and the acquired second group of correction signals looped back by the antenna, so as to perform channel correction on each service transmit channel.

With reference to the eighth aspect of the present disclosure, the present disclosure also has a nineteenth possibility, where, when the baseband unit BBU is applied to a frequency division duplex transmission mode, the at least one correction signal receive channel included in the remote radio unit that has a communication connection to the baseband unit BBU is a standing wave detecting channel, a working frequency of the standing wave detecting channel is the same as a working frequency of the service transmit channel of the remote radio unit RRU, and the receiving a correction signal that is transmitted over each service transmit channel of the remote radio unit RRU, looped back by an antenna, and fed by the correction signal receive channel includes:

receiving a correction signal that is transmitted over each service transmit channel of the remote radio unit RRU, looped back by the antenna, and fed by the standing wave detecting channel.

With reference to the eighth aspect of the present disclosure, the present disclosure also has a twentieth possibility, where, when the baseband unit BBU is applied to a frequency division duplex transmission mode, the at least one correction signal receive channel included in the remote radio unit that has a communication connection to the baseband unit BBU is a correction receive channel, a working frequency of the correction receive channel is the same as a working frequency of the service transmit channel of the remote radio unit RRU, the correction receive channel is different from a service receive channel, and the receiving a correction signal that is transmitted over each service transmit channel of the remote radio unit RRU, looped back by an antenna, and fed by the correction signal receive channel includes:

receiving a correction signal that is transmitted over each service transmit channel of the remote radio unit RRU, looped back by the antenna, and fed by the correction receive channel.

With reference to the eighth aspect of the present disclosure, the present disclosure also has a twenty-first possibility, where, when the baseband unit BBU is applied to a time division duplex transmission mode, the at least one correction signal receive channel included in the remote radio unit that has a communication connection to the baseband unit BBU is a service receive channel, and the receiving a correction signal that is transmitted over each service transmit channel of the remote radio unit RRU, looped back by an antenna, and fed by the correction signal receive channel includes:

receiving a correction signal that is transmitted over each service transmit channel of the remote radio unit RRU, looped back by the antenna, and fed by the service receive channel.

One aspect of the embodiments of the present disclosure may achieve the following beneficial effects: According to the method and apparatus provided in the present disclosure, a remote radio unit RRU that has a communication connection to a baseband unit has at least one standing wave detecting channel, and a working frequency of the standing wave detecting channel is the same as a working frequency of a service transmit channel of the RRU, so that the standing wave detecting channel can receive a correction signal that is transmitted over each service transmit channel of the RRU and looped back by an antenna, so that the BBU can calculate a correction coefficient of each service transmit channel according to the correction signal that is transmitted over each service transmit channel of the RRU and looped back by the antenna, and separately perform channel correction on each service transmit channel, thereby implementing correction between channels of the remote radio unit in an FDD mode, implementing delay consistency between the channels of the remote radio unit, and remarkably improving system performance.

BRIEF DESCRIPTION OF DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

FIG. 10 is a schematic diagram of a third embodiment of a baseband unit BBU according to an embodiment of the present disclosure;

FIG. 11 is a schematic diagram of a first embodiment of a method for correcting a channel of a remote radio unit according to an embodiment of the present disclosure;

It should be noted that, in the foregoing figures, a dashed line indicates a transmit direction of a correction signal, and a dot-dashed line indicates a receive direction of a correction signal.

DESCRIPTION OF EMBODIMENTS

To make a person skilled in the art understand the technical solutions in the present disclosure better, the following clearly and describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
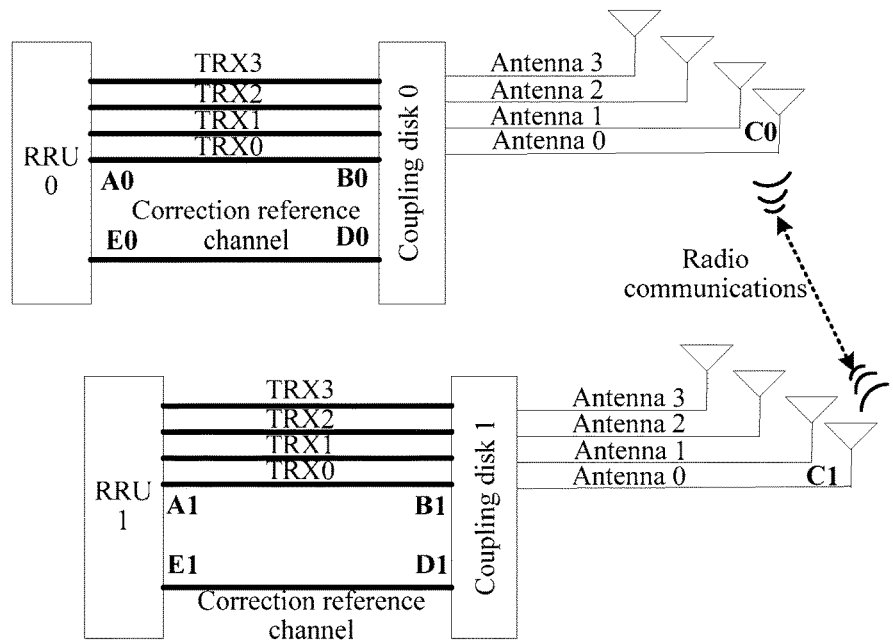
FIG. 1 is a schematic diagram of a method for correcting a channel of a combined RRU in a TDD system in the prior art.
Figure 2:
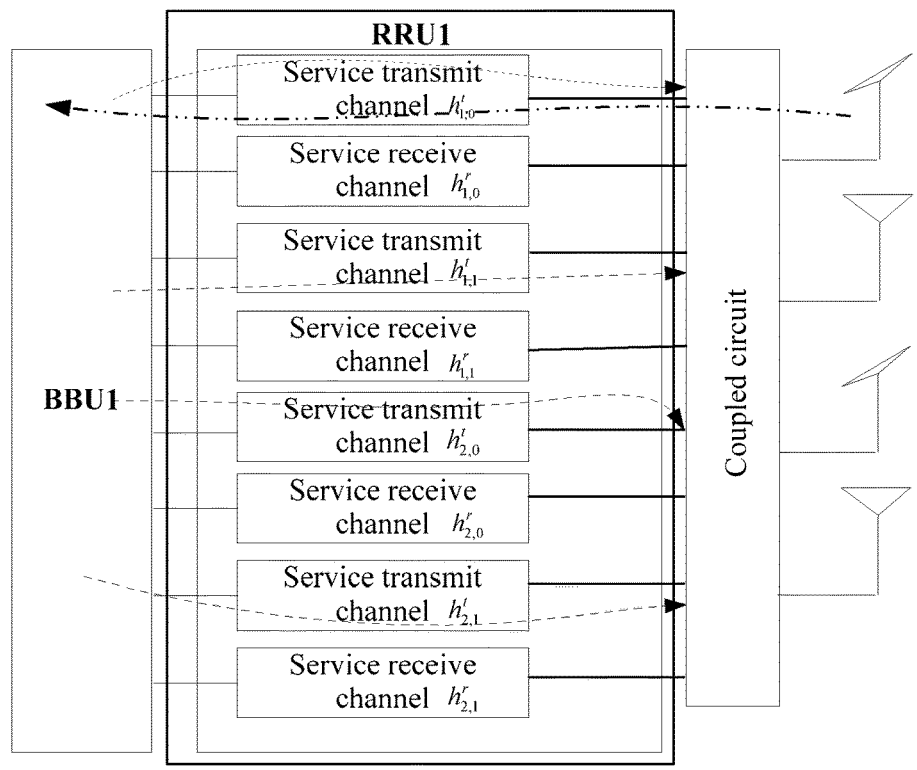
FIG. 2 is a schematic diagram of a first embodiment of a base station according to an embodiment of the present disclosure.

An embodiment of the present disclosure provides a base station. As shown in FIG. 2, FIG. 2 is a schematic diagram of a first embodiment of a base station according to an embodiment of the present disclosure. The base station provided in the present disclosure may be applied to a system which includes but is not limited to an FDD system, a COMP system or another communications system. Unless otherwise stated, the base station, an RRU, and a BBU that are provided in the present disclosure are applied to an FDD transmission mode.

A base station is provided, where the base station includes a baseband unit BBU and at least one remote radio unit RRU, the remote radio unit RRU has a communication connection to the baseband unit BBU, the remote radio unit RRU includes one or more service transmit channels and a standing wave detecting channel, and a working frequency of the service transmit channel is the same as a working frequency of the standing wave detecting channel, where the baseband unit is configured to send a correction signal to the remote radio unit RRU that has the communication connection to the baseband unit BBU; receive a correction signal that is transmitted over each service transmit channel of the remote radio unit RRU, looped back by an antenna, and fed by the standing wave detecting channel; and calculate a correction coefficient of each service transmit channel according to the received correction signal that is transmitted over each service transmit channel of the remote radio unit RRU and looped back by the antenna, and separately perform channel correction on each service transmit channel; and the remote radio unit RRU is configured to transmit, through the service transmit channel, the correction signal sent by the baseband unit; and receive the correction signal looped back by the antenna, and send, to the baseband unit BBU, the correction signal looped back by the antenna.

In the base station shown in FIG. 2, a baseband unit BBU1 has a communication connection to a remote radio unit RRU1. The shown RRU1 is a 4T4R RRU, and has four service transmit channels ($h_{1,0}{}^t$, $h_{1,1}{}^t$, $h_{1,2}{}^t$, $h_{1,3}{}^t$) and four service receive channels ($h_{1,0}{}^r$, $h_{1,1}{}^r$, $h_{1,2}{}^r$, $h_{1,3}{}^r$). The shown RRU has at least one standing wave detecting channel (not shown in the figure), where the standing wave detecting channel and the service transmit channels may be integrated together or may be physically separate. The following briefly introduces the standing wave detecting channel. Generally, the standing wave detecting channel and the service transmit channels have a corresponding association relationship, where one standing wave detecting channel corresponds to one service transmit channel and is configured to detect a standing wave ratio of the corresponding service transmit channel. When a radio frequency signal sent forward by the RRU passes through an inconsecutive transmission medium, the radio frequency signal is reflected and the reflected signal is referred to as a standing wave. The reflected signal and the transmitted signal are superposed. During the superposition, because a phase of the reflected signal is different from a phase of the transmitted signal, signal amplitudes are different, and a place in which phases are the same has a maximum amplitude, a place in which phases are opposite has a minimum amplitude, and a ratio of the maximum amplitude to the minimum amplitude is referred to as a standing wave ratio. The standing wave detecting channel is configured to calculate the standing wave ratio of the reflected signal of the corresponding service transmit channel. Certainly, another channel, circuit, apparatus or module that is used to implement a function of the standing wave detecting channel also falls within the protection scope of the present disclosure as long as a working frequency thereof is the same as a working frequency of the service transmit channel. A person skilled in the art can understand that the RRU may have only one standing wave detecting channel that is shared by service transmit channels (for example, a bilateral switch is set in the standing wave detecting channel, and by closing the bilateral switch, a case in which the standing wave detecting channel is connected to or disconnected from one of the service transmit channels is implemented, but the standing wave detecting channel is not limited thereto), or each service transmit channel may correspond to one standing wave detecting channel. A quantity of service transmit channels is greater than or equal to a quantity of standing wave detecting channels.

As shown in the figure, the service transmit channel $h_{1,0}{}^t$ of the RRU1 has a corresponding standing wave detecting channel (the standing wave detecting channel is not shown in the figure, but the correction signal looped back by the antenna is sent to the BBU through the standing wave detecting channel corresponding to the service transmit channel $h_{1,0}{}^t$), and a working frequency of the standing wave detecting channel is the same as a working frequency of the service transmit channel $h_{1,0}{}^t$. In this case, because the working frequency of the standing wave detecting channel is the same as the working frequency of the service transmit channel, when the BBU1 transmits the correction signal to the RRU1 connected to the BBU1, the correction signal may be transmitted through the four service transmit channels ($h_{1,0}{}^t$, $h_{1,1}{}^t$, $h_{1,2}{}^t$, $h_{1,3}{}^t$) of the RRU1, and then the standing wave detecting channel receives correction signals that are transmitted over the four service transmit channels ($h_{1,0}{}^t$, $h_{1,1}{}^t$, $h_{1,2}{}^t$, $h_{1,3}{}^t$) of the RRU1 and looped back by the antenna, and feeds the received correction signals looped back by the antenna to the BBU1, so that the BBU1 calculates a correction coefficient of each service transmit channel according to the correction signals that are transmitted over each service transmit channel of the remote radio unit RRU and looped back by the antenna and separately performs channel correction on each service transmit channel. It should be noted that, the RRU shown in FIG. 2 has one standing wave detecting channel, that is, only the service transmit channel $h_{1,0}{}^t$ has the corresponding standing wave detecting channel. A person skilled in the art can understand that, the RRU may have multiple standing wave detecting channels, for example, each service transmit channel has one standing wave detecting channel, and certainly, two service transmit channels may also share one standing wave detecting channel. In the figure, a dashed line indicates a transmit direction of a correction signal, and a dot-dashed line indicates a receive direction of a correction signal.

Figure 3:
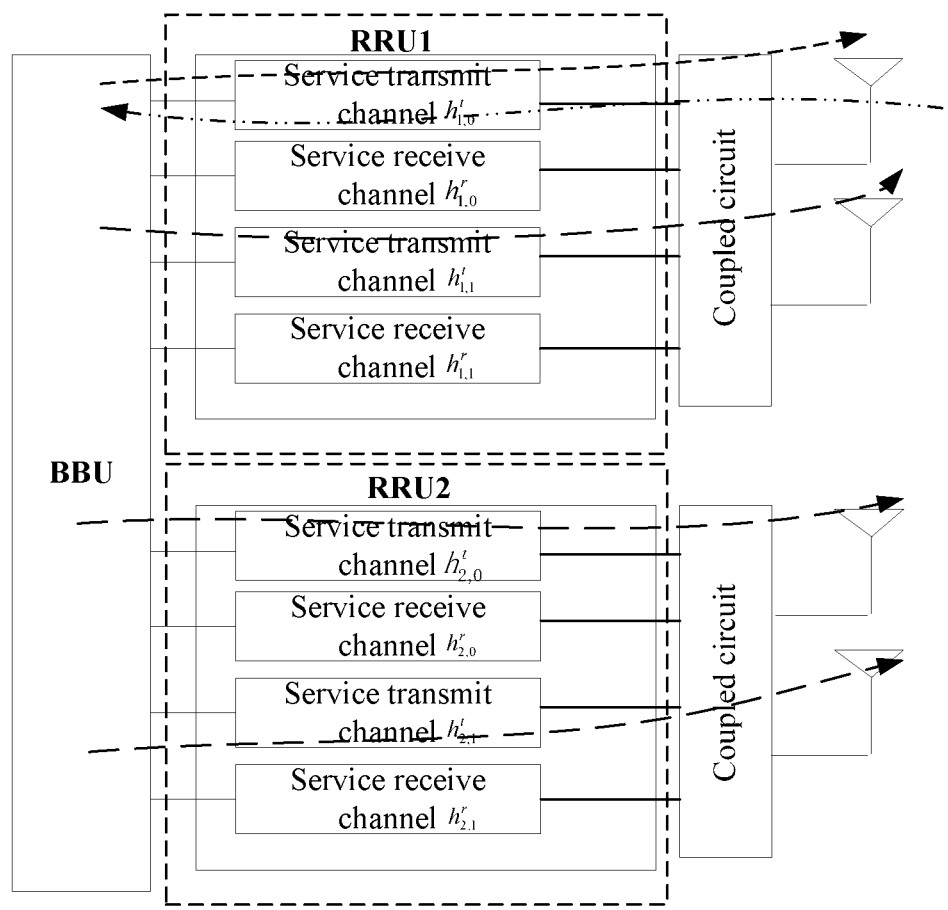
FIG. 3 is a schematic diagram of a second embodiment of a base station according to an embodiment of the present disclosure.

An embodiment of the present disclosure further provides a base station. As shown in FIG. 3, FIG. 3 is a schematic diagram of a second embodiment of a base station according to an embodiment of the present disclosure.

A base station is provided, where the base station includes a baseband unit BBU and at least two remote radio units RRUs, the at least two remote radio units RRUs include a first remote radio unit RRU1 and a second remote radio unit RRU2, the first remote radio unit has a standing wave detecting channel, and a working frequency of the standing wave detecting channel is the same as a working frequency of each service transmit channel of the at least two remote radio units, where the baseband unit is configured to send a correction signal to the first remote radio unit and the second remote radio unit that have a communication connection to the baseband unit BBU; and receive a correction signal that is transmitted over each service transmit channel of the first remote radio unit RRU, looped back by an antenna, and fed by the standing wave detecting channel and a correction signal that is transmitted over each service transmit channel of the second remote radio unit RRU, looped back by the antenna, and fed by the standing wave detecting channel, calculate a correction coefficient of each service transmit channel according to the correction signal that is transmitted over each service transmit channel of the second remote radio unit RRU and looped back by the antenna and the correction signal that is transmitted over each service transmit channel of the first remote radio unit RRU and looped back by the antenna, and separately perform channel correction on each service transmit channel;

the first remote radio unit is configured to transmit, through the service transmit channel, the correction signal sent by the baseband unit; and receive, through the standing wave detecting channel, correction signals looped back by the antenna, and send, to the baseband unit BBU, the correction signals looped back by the antenna, where the correction signals looped back by the antenna include the correction signal that is transmitted over each service transmit channel of the first remote radio unit RRU and looped back by the antenna1 and the correction signal that is transmitted over each service transmit channel of the second remote radio unit RRU and looped back by the antenna2; and the second remote radio unit is configured to transmit, through the service transmit channel, the correction signal sent by the baseband unit.

Further, in a possible implementation manner, the second remote radio unit has at least one standing wave detecting channel, where the second remote radio unit is further configured to:

receive, through the standing wave detecting channel, the correction signals looped back by the antenna, and send, to the baseband unit BBU, the correction signals looped back by the antenna, where the correction signals looped back by the antenna include the correction signal that is transmitted over each service transmit channel of the first remote radio unit RRU and looped back by the antenna and the correction signal that is transmitted over each service transmit channel of the second remote radio unit RRU and looped back by the antenna.

In specific implementation, the base station may have multiple RRUs, where at least one RRU has at least one standing wave detecting channel. FIG. 3 shows a case in which the base station includes two remote radio units RRUs, where the two remote radio units include a first remote radio unit RRU1 and a second remote radio unit RRU2. As shown in FIG. 3, the first remote radio unit RRU1 includes two service transmit channels ($h_{1,0}{}^t$, $h_{1,1}{}^t$) and two service receive channels ($h_{1,0}{}^r$, $h_{1,1}{}^r$) where the service transmit channel $h_{1,0}{}^t$ has a corresponding standing wave detecting channel and may receive a correction signal looped back by an antenna. Certainly, a person skilled in the art can understand that, in specific implementation, it may also be that the service transmit channel $h_{1,1}{}^t$ has a corresponding standing wave detecting channel, or the two service transmit channels both have corresponding standing wave detecting channels, or the two service transmit channels share one standing wave detecting channel. The second remote radio unit RRU2 includes two service transmit channels ($h_{2,0}{}^t$, $h_{2,1}{}^t$) and two service receive channels ($h_{2,0}{}^r$, $h_{2,1}{}^r$), where the service transmit channel $h_{2,0}{}^t$ has a corresponding standing wave detecting channel and may receive a correction signal looped back by an antenna. As shown in FIG. 3, when the BBU1 sends a correction signal to the RRU1 and the RRU2 that are connected to the BBU1, the correction signal may be transmitted through the service transmit channels ($h_{1,0}{}^t$, $h_{1,1}{}^t$) of the RRU1 and the service transmit channels ($h_{2,0}{}^t$, $h_{2,1}{}^t$) of the RRU2, and then the standing wave detecting channel corresponding to the service transmit channel $h_{1,0}{}^t$ receives correction signals that are transmitted over the two service transmit channels of the RRU1 and looped back by the antenna and correction signals that are transmitted over the two service transmit channels of the RRU2 and looped back by the antenna, and feeds a group of received correction signals (including four correction signals) looped back by the antenna to the BBU1, so that the BBU1 calculates a correction coefficient of the each service transmit channel according to correction signals that are transmitted over the each service transmit channel of the second remote radio unit RRU2 and looped back by the antenna and correction signals that are transmitted over the each service transmit channel of the first remote radio unit RRU1 and looped back by the antenna, and separately performs channel correction on each service transmit channel. The service transmit channels include the service transmit channels ($h_{1,0}{}^t$, $h_{1,1}{}^t$) of the RRU1 and the service transmit channels ($h_{2,0}{}^t$, $h_{2,1}{}^t$) of the RRU2. It should be noted that both the RRU1 and the RRU2 shown in FIG. 3 have one standing wave detecting channel, that is, the service transmit channels $h_{1,0}{}^t$ and $h_{2,0}{}^t$ have a corresponding standing wave detecting channel. A person skilled in the art can understand that, both the RRU1 and the RRU2 may have multiple standing wave detecting channels, for example, each service transmit channel has one corresponding standing wave detecting channel. Certainly, it may also be that only one RRU of the first remote radio unit RRU1 and the second remote radio unit RRU2 has a standing wave detecting channel.

It should be noted that in the base station shown in FIG. 3, the baseband unit BBU separately implements a communication connection to the first remote radio unit RRU1 and the second remote radio unit RRU2 by using a fiber direct connection. In specific implementation, the baseband unit BBU may have a direct communication connection to the first remote radio unit RRU1 and have an indirect communication connection to the second remote radio unit RRU2; or the baseband unit BBU may have an indirect communication connection to the first remote radio unit RRU1 and have a direct communication connection to the second remote radio unit RRU2. In specific setting, the BBU has a direct communication connection to the first remote radio unit RRU1, and the first remote radio unit RRU1 connects to the second remote radio unit RRU2, so that an indirect communication connection is implemented between the BBU and the second remote radio unit RRU2. For example, the BBU may connect to one RRU of the RRU1 and the RRU2 by using an optical fiber, and the RRU connects to the other RRU by using another optical fiber. In this implementation manner, that the RRU1 and the RRU2 are 2T2R RRUs is still used as an example for description. When sending a correction signal, the BBU first sends two correction signals (corresponding to the two service transmit channels of the RRU1) to the RRU1 that has a direct communication connection to the BBU, and then after a period of time, sends two correction signals (corresponding to the two service transmit channels of the RRU2) corresponding to the RRU2, and the two correction signals corresponding to the RRU2 are sent to the RRU2 by using the RRU1. Because the BBU sends the signals to the two RRUs at staggered times, both the two RRUs can receive the corresponding correction signals. Then, the correction signals are separately transmitted over respective service transmit channels, and the correction signals looped back by the antenna are fed to the BBU through the standing wave detecting channel.

Figure 4:
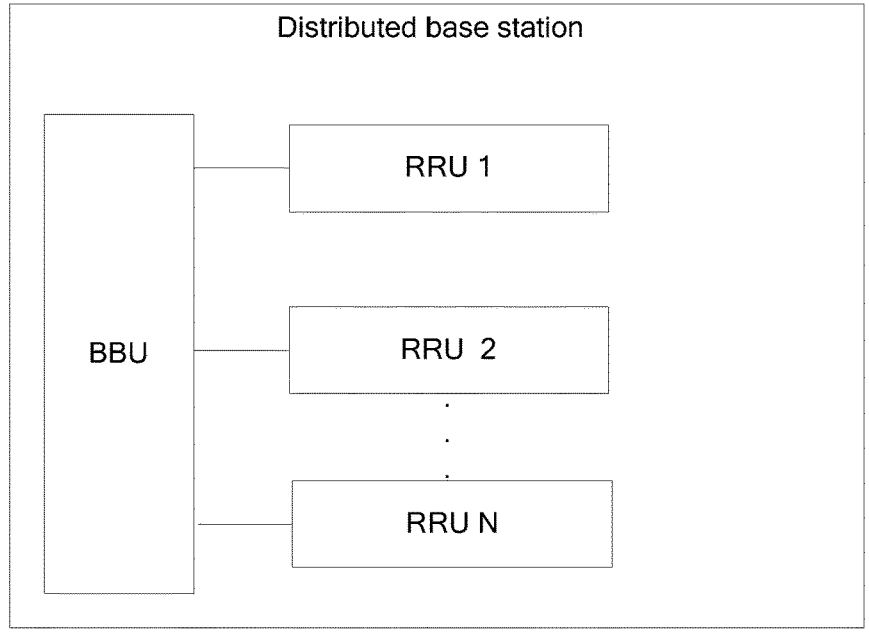
FIG. 4 is a schematic diagram of a third embodiment of a base station according to an embodiment of the present disclosure.

Referring to FIG. 4, FIG. 4 is a schematic diagram of a third embodiment of a base station according to an embodiment of the present disclosure. In FIG. 4, the base station includes multiple remote radio units RRUs (an RRU1, an RRU2 . . . and an RRUN). At least one RRU has at least one standing wave detecting channel. Certainly, it may also be that each RRU has a standing wave detecting channel.

The following describes specific implementation of a baseband unit BBU and a remote radio unit RRU in the base station in detail.

Figure 5:
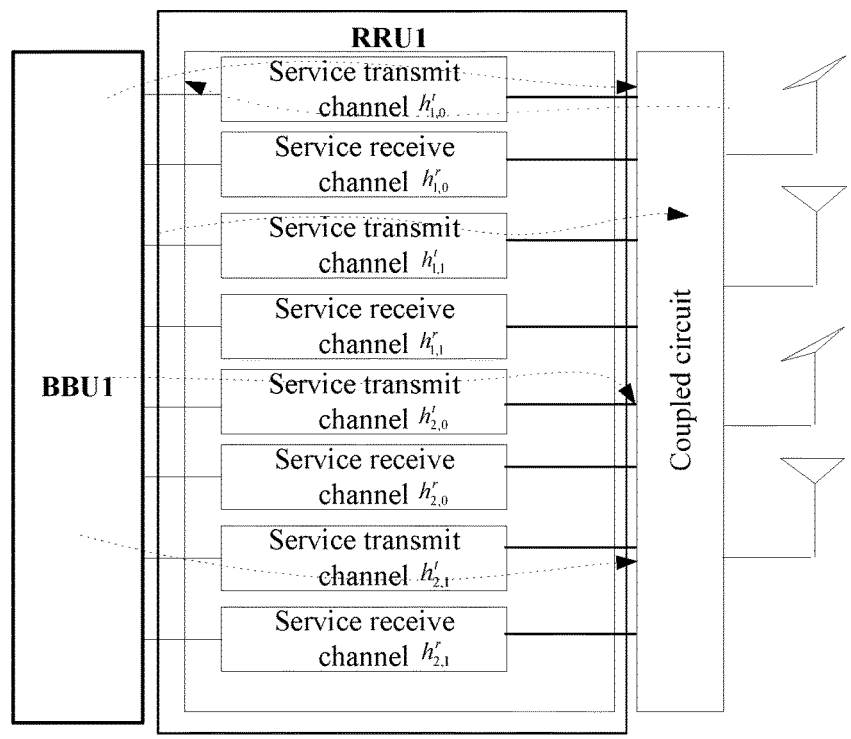
FIG. 5 is a schematic diagram of a first embodiment of a remote radio unit RRU according to an embodiment of the present disclosure.

Referring to FIG. 5, FIG. 5 is a schematic diagram of a first embodiment of a remote radio unit RRU according to an embodiment of the present disclosure.

A first remote radio unit RRU is provided, where the first remote radio unit RRU is applied to a base station, the base station further includes a baseband unit BBU, and the first remote radio unit RRU has a communication connection to the baseband unit BBU; and the first remote radio unit RRU includes one or more service transmit channels and a standing wave detecting channel, and a working frequency of the service transmit channel is the same as a working frequency of the standing wave detecting channel, where:

the service transmit channel is configured to transmit a correction signal, where the correction signal is sent by the baseband unit BBU to the first remote radio unit RRU; and the standing wave detecting channel is configured to receive a correction signal looped back by an antenna, and send, to the baseband unit BBU, the correction signal looped back by the antenna, so that the baseband unit BBU calculates a correction coefficient of each service transmit channel according to the correction signal looped back by the antenna and separately performs channel correction on each service transmit channel, where the correction signal looped back by the antenna includes at least a correction signal that is transmitted over each service transmit channel of the first remote radio unit RRU and looped back by the antenna.

In specific implementation, the first remote radio unit RRU has a service transmit channel and at least one standing wave detecting channel. FIG. 5 shows a case in which the first remote radio unit RRU has four service transmit channels and four service receive channels. In this embodiment of the present disclosure, the baseband unit BBU may send, in a frequency division manner, a code division manner, or another manner, a correction signal to the RRU that is connected to the BBU. Correction signals that are transmitted by the BBU over the service transmit channels of the RRU may be the same, or may be different. The foregoing correction signal may be a common reference signal (CRS, Common Reference Signal), or may be another correction signal that is redesigned and has a good feature, which is not limited herein. Each service transmit channel of the first remote radio unit RRU transmit a received correction signal. Preferably, after the correction signal sent by the BBU is processed by a DAC (Digital to Analog Convertor), the RRU converts a digital signal into an analog signal, and then performs filtering processing on the acquired analog signal to filter out an unwanted signal component, and outputs the processed correction signal to an antenna unit (antenna). Then, the antenna unit radiates the correction signal through an air interface, and the correction signal performs coupling between antennas, that is, the correction signal is transmitted in wireless space between an antenna and an antenna. In this case, each antenna can receive a correction signal of another antenna, and meanwhile, a correction signal transmitted by each antenna is fed to a loop of the antenna. Because the working frequency of the standing wave detecting channel is consistent with the working frequency of the service transmit channel, the standing wave detecting channel can receive a correction signal that is transmitted over each service transmit channel and looped back by the antenna and can feed, to the baseband unit BBU, the correction signal looped back by the antenna. For example, FIG. 5 shows the RRU of 4T4R, and it is assumed that the BBU sends four correction signals (s1, s2, s3, and s4), and the RRU respectively transmits the correction signals over the four transmit channels. In this case, the standing wave detecting channel can receive four correction signals looped back by an antenna air interface, and then feed the four correction signals to the baseband unit BBU. Due to a reason that a channel fades, and the like in a transmission process, there is a difference between the four correction signals received by the BBU and the four previously transmitted correction signals. That is, the four correction signals received by the BBU in this case are respectively s1', s2', s3', and s4'. Then, the baseband unit BBU calculates a correction coefficient of each service transmit channel according to the correction signals looped back by the antenna, and separately performs channel correction on each service transmit channel. Specific implementation on the baseband unit BBU is introduced in detail in the following provided embodiment.

Figure 6:
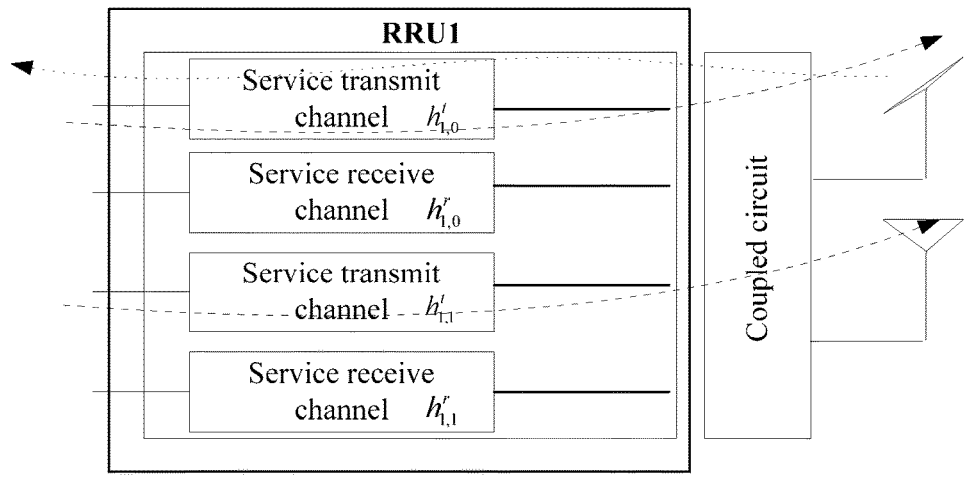
FIG. 6 is a schematic diagram of a second embodiment of a remote radio unit RRU according to an embodiment of the present disclosure.

Referring to FIG. 6, FIG. 6 is a schematic diagram of a second embodiment of a remote radio unit RRU according to an embodiment of the present disclosure.

In this embodiment, a first remote radio unit RRU1 is applied to the base station shown in FIG. 2 or FIG. 3. In this case, the base station includes a baseband unit BBU. The baseband unit BBU has a communication connection to the first remote radio unit RRU1, in addition to that, the baseband unit BBU also has a communication connection to a second remote radio unit RRU2, where the second remote radio unit RRU2 includes one or more service transmit channels, the service transmit channel is configured to transmit a correction signal, and the correction signal is sent by the baseband unit BBU to the second remote radio unit RRU. In this case, a standing wave detecting channel of the first remote radio unit RRU1 can also receive a correction signal that is transmitted over each service transmit channel of the second remote radio unit RRU and looped back by an antenna. In specific implementation, the standing wave detecting unit is configured to: receive a correction signal that is transmitted over each service transmit channel of the first remote radio unit RRU and looped back by the antenna and the correction signal that is transmitted over each service transmit channel of the second remote radio unit RRU and looped back by the antenna, and send, to the baseband unit BBU, the correction signal that is transmitted over each service transmit channel of the first remote radio unit RRU and looped back by the antenna and the correction signal that is transmitted over each service transmit channel of the second remote radio unit RRU and looped back by the antenna, so that the baseband unit BBU calculates a correction coefficient of each service transmit channel according to the correction signal that is transmitted over each service transmit channel of the second remote radio unit RRU and looped back by the antenna and the correction signal that is transmitted over each service transmit channel of the first remote radio unit RRU and looped back by the antenna, and separately performs the channel correction on each service transmit channel.

Figure 7:
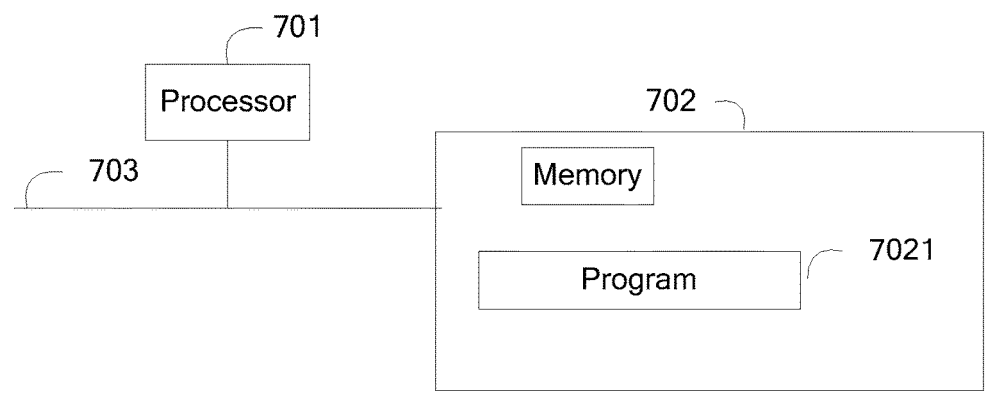
FIG. 7 is a schematic diagram of a third embodiment of a remote radio unit RRU according to an embodiment of the present disclosure.

FIG. 7 is a schematic diagram of a third embodiment of a remote radio unit RRU according to an embodiment of the present disclosure.

FIG. 7 describes a structure of a remote radio unit RRU provided in another embodiment of the present disclosure, where the remote radio unit RRU includes at least one processor 701 (such as a CPU), a memory 702, and at least one communications bus 703 that is configured to implement connection and communication between these apparatuses. The processor 701 is configured to execute an executable module, such as a computer program, stored in the memory 702. The memory 702 may include a high-speed random access memory (RAM: Random Access Memory), and may also include a non-volatile memory (non-volatile memory), such as at least one disk memory.

In some implementation manners, the memory 702 stores a program 7021, where the program 7021 may be executed by the processor 701 and this program includes: transmitting a correction signal through each service transmit channel, where the correction signal is sent to a first remote radio unit RRU by a baseband unit BBU that is connected to the first remote radio unit RRU; receiving, by using at least one standing wave detecting channel, a correction signal looped back by an antenna, and sending, to the baseband unit BBU, the correction signal looped back by the antenna, so that the baseband unit BBU calculates a correction coefficient of each service transmit channel according to the correction signal looped back by the antenna, and separately performs channel correction on each service transmit channel, where the correction signal looped back by the antenna includes at least a correction signal that is transmitted over each service transmit channel of the first remote radio unit RRU and looped back by the antenna.

The program 7021 may also include that: When the baseband unit BBU that has a communication connection to the remote radio unit RRU also has a communication connection to a second remote radio unit RRU and the second remote radio unit RRU includes one or more service transmit channels, the service transmit channel is configured to transmit a correction signal, where the correction signal is sent by the baseband unit BBU to the second remote radio unit RRU; a correction signal that is transmitted over each service transmit channel of the first remote radio unit RRU and looped back by the antenna and a correction signal that is transmitted over each service transmit channel of the second remote radio unit RRU and looped back by the antenna are received by using at least one standing wave detecting unit; and the correction signal that is transmitted over each service transmit channel of the first remote radio unit RRU and looped back by the antenna and the correction signal that is transmitted over each service transmit channel of the second remote radio unit RRU and looped back by the antenna are sent to the baseband unit BBU, so that the baseband unit BBU calculates a correction coefficient of each service transmit channel according to the correction signal that is transmitted over each service transmit channel of the second remote radio unit RRU and looped back by the antenna and the correction signal that is transmitted over each service transmit channel of the first remote radio unit RRU and looped back by the antenna, and separately performs the channel correction on each service transmit channel.

Figure 8:
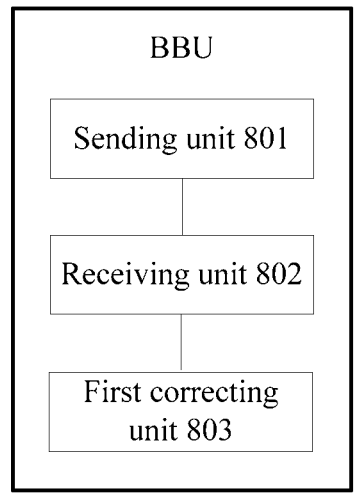
FIG. 8 is a schematic diagram of a first embodiment of a baseband unit BBU according to an embodiment of the present disclosure.

FIG. 8 is a schematic diagram of a first embodiment of a baseband unit BBU according to an embodiment of the present disclosure.

A baseband unit BBU is provided, where the baseband unit BBU is applied to a base station, and the baseband unit BBU has a communication connection to at least one remote radio unit, where the at least one remote radio unit has at least one standing wave detecting channel and one or more service transmit channels, a working frequency of the standing wave detecting channel is the same as a working frequency of the service transmit channel, and the baseband unit BBU includes a sending unit 801, a receiving unit 802, and a correcting unit 803.

The sending unit 801 is configured to send a correction signal to the remote radio unit RRU that has the communication connection to the baseband unit BBU. In specific implementation, the sending unit 801 may transmit, in a frequency division manner, a code division manner, or another manner, the correction signal to the RRU that is connected to the baseband unit BBU. Correction signals that are transmitted by the BBU over the service transmit channels of the RRU may be the same, or may be different. The foregoing correction signal may be a common reference signal (CRS, Common Reference Signal), or may be another correction signal that is redesigned and has a good feature, which is not limited herein.

The receiving unit 802 is configured to receive a correction signal that is transmitted over each service transmit channel of the remote radio unit RRU, looped back by an antenna, and fed by the standing wave detecting channel.

The first correcting unit 803 is configured to calculate a correction coefficient of each service transmit channel according to the correction signal that is transmitted over each service transmit channel of the remote radio unit RRU, looped back by the antenna, and received by the receiving unit, and separately perform channel correction on each service transmit channel.

In specific implementation, the first correcting unit 803 is configured to: perform channel estimation on each service transmit channel according to the correction signal that is transmitted over each service transmit channel of the remote radio unit RRU, looped back by the antenna, and received by the receiving unit to obtain a channel response value of each service transmit channel; obtain a delay difference between each service transmit channel and a reference transmit channel according to the channel response value of each service transmit channel; and obtain the correction coefficient by using the obtained delay difference, and perform channel compensation on each service transmit channel by using the correction coefficient. The reference transmit channel is one service transmit channel of all service transmit channels, and the service transmit channel meets a preset condition. A correction coefficient of the reference transmit channel may be 1. In this embodiment of the present disclosure, one transmit channel of the service transmit channels may be determined as the reference transmit channel according to a principle. For example, one transmit channel in the foregoing service transmit channels may be determined as the reference transmit channel according to a minimum delay principle; or a transmit channel with a minimum number may be selected as the reference transmit channel according to a minimum number principle, for example, a service transmit channel $h_{1,0}{}^t$ is used as the reference transmit channel; or one of the service transmit channels may be randomly determined as the reference transmit channel, which is not limited in the present disclosure.

When the first correcting unit obtains the delay difference between each service transmit channel and the reference transmit channel by using the channel response value of each service transmit channel, a possible implementation manner includes: obtaining, by the first correcting unit, a phase difference between each service transmit channel and the reference transmit channel according to the channel response value of each service transmit channel, and obtaining the delay difference between each service transmit channel and the reference transmit channel by using the acquired phase difference. For example, it is assumed that correction signals sent by the BBU to the RRU include S1, S2, S3, and S4, the correction signals S1, S2, S3, and S4, are respectively transmitted over service transmit channels 0-3 of the RRU, and correction signals that are looped back by the antenna are S1', S2', S3', and S4' and received by the receiving unit 802, where the S1' is a looped back signal after the S1 passes through the service transmit channel 1 and the standing wave detecting channel, the S2' is a looped back signal after the S2 passes through the service transmit channel 2 and the standing wave detecting channel, S3' is a looped back signal after the S3 passes through the transmit channel 3 and the standing wave detecting channel, and S4' is a looped back signal after the S4 passes through the service transmit channel 4 and the standing wave detecting channel. The correcting unit 803 first separately performs channel estimation on the service transmit channels 0-3 according to the correction signals that are looped back by the antenna, fed by the standing wave detecting channel, and received by the receiving unit 802, to obtain channel response values of the service transmit channels, where the channel response values of the service transmit channels are respectively recorded as h (0, 0, k), h (0, 1, k), h (0, 2, k), and h (0, 3, k). That the reference transmit channel is the service transmit channel $h_{1,0}{}^t$ is used as an example in the following to describe how to calculate a delay difference between the service transmit channel 0 and the service transmit channel 1. An LTE system is used as an example. It is assumed that the h (0, 0, k) indicates a channel response value that is of a kth subcarrier, of the service transmit channel 0, and of a standing wave detecting channel 0, the h (0, 1, k) indicates a channel response value that is of the kth subcarrier, of the service transmit channel 1, and of the standing wave detecting channel 0, the h (0, 2, k) indicates a channel response value that is of the kth subcarrier, of a service transmit channel 2, and of the standing wave detecting channel 0, and the h (0, 3, k) indicates a channel response value that is of the kth subcarrier, of a service transmit channel 3, and of the standing wave detecting channel 0. Conjugate multiplication processing is performed on the h (0, 0, k) and the h (0, 1, k) to obtain a multiplication result, that is, a phase difference $\Delta\theta_2(k)$ between the service transmit channel 0 and the service transmit channel 1, of the kth subcarrier, is obtained, and then an equivalent $\Delta\theta_2$ is calculated for all subcarriers. Then, the obtained phase difference is used to obtain the delay difference by calculation, and a calculation manner is:

$$\Delta\tau_i = \frac{\Delta\theta_i}{2\pi f} \quad (1)$$

where f indicates a frequency domain width of a subcarrier.

By analogy, the delay difference between each service transmit channel and the reference transmit channel is separately obtained by calculation. In a possible implementation manner, the delay difference is used as a correction coefficient. Certainly, the correction coefficient may also be obtained in the following manner:

That compensation is performed on a data frequency domain is used as an example, and a calculation formula of the correction coefficient is:

$$\beta_i{}^t(k) = \exp(j2\pi k f \Delta\tau_i) \quad (2)$$

where f indicates a frequency domain width of a subcarrier, k indicates an index number of the subcarrier, and $\Delta\tau$ indicates a delay difference of a jth transmit channel of an ith RRU relative to the reference channel.

It should be noted that when the first correcting unit obtains the delay difference between each service transmit channel and the reference transmit channel by using the channel response value of each service transmit channel, a possible implementation manner includes: transforming, by the correcting unit, the channel response value of each service transmit channel to a time domain, and separately obtaining a time domain sample point corresponding to a maximum modulus value of the response value of each service transmit channel and using the time domain sample point as a delay of the service transmit channel, so as to obtain the delay difference between each service transmit channel and the reference transmit channel. For example, it is assumed that correction signals sent by the BBU to the RRU include S1, S2, S3, and S4, the correction signals S1, S2, S3, and S4, are respectively transmitted over service transmit channels 0-3 of the RRU, and correction signals that are looped back by the antenna are S1', S2', S3', and S4' and received by the receiving unit 802, where the S1' is a looped back signal after the S1 passes through the service transmit channel 1 and the standing wave detecting channel, the S2' is a looped back signal after the S2 passes through the service transmit channel 2 and the standing wave detecting channel, S3' is a looped back signal after the S3 passes through the transmit channel 3 and the standing wave detecting channel, and S4' is a looped back signal after the S4 passes through the service transmit channel 4 and the standing wave detecting channel. The correcting unit 803 first separately performs channel estimation on the service transmit channels 0-3 according to the correction signals that are looped back by the antenna, fed by the standing wave detecting channel, and received by the receiving unit 802 to obtain channel response values of the service transmit channels, where the channel response values of the service transmit channels are respectively recorded as h (0, 0, k), h (0, 1, k), h (0, 2, k), and h (0, 3, k). That the reference transmit channel is the service transmit channel $h_{1,0}{}^r$ is used as an example in the following to describe how to calculate a delay difference between the service transmit channel 0 and the service transmit channel 1. An LTE system is used as an example. It is assumed that the h (0, 0, k) indicates a channel response value that is of a kth subcarrier, of the service transmit channel 0, and of a standing wave detecting channel 0, the h (0, 1, k) indicates a channel response value that is of the kth subcarrier, of the service transmit channel 1, and of the standing wave detecting channel 0, the h (0, 2, k) indicates a channel response value that is of the kth subcarrier, of a service transmit channel 2, and of the standing wave detecting channel 0, and the h (0, 3, k) indicates a channel response value that is of the kth subcarrier, of a service transmit channel 3, and of the standing wave detecting channel 0. The correcting unit transforms the channel response values of the service transmit channels to a time domain by using a Fourier transform, and then calculates the delay difference between each service transmit channel and the reference transmit channel in the time domain. For example, the service transmit channel 0 is used as the reference transmit channel. A channel correction apparatus separately transforms the h (0, 0, k), h (0, 1, k), h (0, 2, k), and h (0, 3, k) to the time domain by using the Fourier transform, which are separately recorded as h (0, 0, n), h (0, 1, n), h (0, 2, n), and h (0, 3, n), where n indicates a time domain sample point. Then a maximum modulus value is searched for from the h (0, 0, n), and a time domain sample point corresponding to this maximum modulus value is used as a delay $\tau_0$ of the service transmit channel 0; a maximum modulus value is searched for from the h (0, 1, n), and a time domain sample point corresponding to this maximum modulus value is used as a delay $\tau_1$ of the transmit channel 1; a maximum modulus value is searched for from the h (0, 2, n), and a time domain sample point corresponding to this maximum modulus value is used as a delay $\tau_2$ of the transmit channel 3; and a maximum modulus value is searched for from the h (0, 3, n), and a time domain sample point corresponding to this maximum modulus value is used as a delay $\tau_3$ of the transmit channel 4. Delays of two channels are separately subtracted from each other to obtain a delay difference. For example, the $\tau_1$ is subtracted from the $\tau_0$ to obtain a delay difference $\Delta\tau_1$ between the transmit channel 1 and the transmit channel 0; the $\tau_2$ is subtracted from the $\tau_0$ to obtain a delay difference $\Delta\tau_2$ between the transmit channel 2 and the transmit channel 0; and the $\tau_3$ is subtracted from the $\tau_0$ to obtain a delay difference $\Delta\tau_3$ between the transmit channel 3 and the transmit channel 0. Then the $\Delta\tau_1$, $\Delta\tau_2$, and $\Delta\tau_3$ are respectively used as a factor to calculate correction coefficients of the transmit channel 1, the transmit channel 2, and the transmit channel 3, and a correction coefficient of the transmit channel 0 is 1.

When the first correcting unit performs the channel correction on each service transmit channel by using the acquired correction coefficients, transmit data of each service transmit channel is corrected by using the correction coefficients obtained by calculation, so as to implement correction on each service transmit channel, which is described in detail in the following.

For a communication system, in a case in which correction is not performed, a received signal may be expressed as:

$$[r] = [h_0 \quad h_1 \quad h_2 \quad h_3] \begin{bmatrix} s_0 \\ s_1 \\ s_2 \\ s_3 \end{bmatrix} + [n_0] \qquad (3)$$

where r is the received signal, $[h_0 \ h_1 \ h_2 \ h_3]$ are response values of the four service transmit channels, $$\begin{bmatrix} s_0 \\ s_1 \\ s_2 \\ s_3 \end{bmatrix}$$

are transmit signals, and $n_0$ indicates noise.

$[h_0 \ h_1 \ h_2 \ h_3]$ indicate the response values of the service transmit channels. To implement correction on each service transmit channel of the RRU, each factor in $[h_0 \ h_1 \ h_2 \ h_3]$ needs to be multiplied by a correction factor, and therefore, equivalent channel responses $[\beta_0 h_0 \ \beta_1 h_1 \ \beta_2 h_2 \ \beta_3 h_3]$ may be obtained.

In specific implementation, each factor in $[h_0 \ h_1 \ h_2 \ h_3 \ h_3]$ may be respectively multiplied by $$\begin{bmatrix} \beta_0 s_0 \\ \beta_1 s_1 \\ \beta_2 s_2 \\ \beta_3 s_3 \end{bmatrix}.$$

In this way, an objective of performing correction on the channel responses can be achieved. Specific processing is shown in a formula (4):

$$[r] = [h_0 \quad h_1 \quad h_2 \quad h_3] \begin{bmatrix} \beta_0 s_0 \\ \beta_1 s_1 \\ \beta_2 s_2 \\ \beta_3 s_3 \end{bmatrix} + [n_0] \qquad (4)$$

$$= [\beta_0 h_0 \quad \beta_1 h_1 \quad \beta_2 h_2 \quad \beta_3 h_3] \begin{bmatrix} s_0 \\ s_1 \\ s_2 \\ s_3 \end{bmatrix} + [n]$$

In specific implementation, an objective of the channel correction can be achieved by correcting transmit data, which is expressed as:

$$\hat{D}_{i,j}(k) = D_{i,j}(k) * \beta_{i,j}(k) \qquad (5)$$

where $\beta_{i,j}{}^r(k)$ indicates a correction coefficient of a jth transmit channel of an ith RRU, and a specific calculation method is shown in the formula (2). $D_{i,j}(k)$ indicates a frequency domain response of a kth carrier of a jth transmit channel of an ith RRU before the compensation, and $\hat{D}_{i,j}(k)$ indicates a frequency domain response of the kth carrier of the jth transmit channel of the ith RRU after the compensation. In this case, the correction of the service transmit channels is implemented.

In an implementation process of the present disclosure, the inventor finds that for a reason, quality of a signal that is received by the standing wave detecting channel and of a transmit channel may be not reliable. When it is determined that a signal-to-noise ratio of a received correction signal is less than a preset threshold, it is determined that signal quality of the correction signal is not reliable. The preset threshold may be set as required. Through research, the inventor finds that a reason may include that: Because a current signal that is received by a standing wave detecting channel and of a service transmit channel corresponding to the standing wave detecting channel (that is, a correction signal transmitted by the service transmit channel corresponding to the standing wave detecting channel) may be a reflected signal that passes through an interface between an RRU and a radio frequency cable or an interface between a radio frequency cable and an antenna, in this case, the signal does not transmit through the radio frequency cable or does not transmit through an air interface between the antenna and the antenna, and therefore, if the signal is used as a useful signal for transmission, an error of the delay difference obtained by calculation may become bigger, thereby causing deterioration of system performance.

Through research, the inventor finds that another reason may include that: Because of isolation between antennas, quality of a correction signal is not reliable. The correction signal transmitted between antennas generally fades by 30-50 db and even up to 70-80 db, and therefore, after radio frequency filtering sampling processing is performed, a correction signal received by using an antenna may become very weak and even is completely lower than noise power. In this case, quality of a correction signal received by the antenna is very poor, so that calculation of a correction coefficient is not accurate. Therefore, a bridge operation needs to be used to implement joint channel correction of all transmit ends.

In a possible implementation manner of the present disclosure, the first correcting unit is further configured to: when it is determined that quality of a first group of correction signals that are looped back by the antenna and received by the receiving unit is not reliable, acquire a second group of correction signals looped back by the antenna, and calculate a correction coefficient of each service transmit channel by using the acquired first group of correction signals looped back by the antenna and the acquired second group of correction signals looped back by the antenna, so as to perform the channel correction on each service transmit channel.

In specific implementation, when the remote radio unit connected to the baseband unit BBU has only one standing wave detecting channel, the sending unit is further configured to: when the correcting unit determines that the quality of the first group of correction signals that are looped back by the antenna and received by the receiving unit is not reliable, send a second group of correction signals to the remote radio unit RRU that has the communication connection to the baseband unit BBU; and the correcting unit is configured to: acquire the second group of correction signals that are sent in the remote radio unit RRU, looped back by the antenna, and received by the receiving unit, and use the second group of correction signals as the second group of correction signals looped back by the antenna; and calculate the correction coefficient of each service transmit channel by using the acquired first group of correction signals looped back by the antenna and the acquired second group of correction signals looped back by the antenna, so as to perform the channel correction on each service transmit channel.

In specific implementation, the calculating, by the first correcting unit, a correction coefficient of each service transmit channel by using the acquired first group of correction signals looped back by the antenna and the acquired second group of correction signals looped back by the antenna may include: acquiring a first channel set according to the first group of correction signals looped back by the antenna, where the first channel set includes a service transmit channel on which the channel correction is performed by using the first group of correction signals looped back by the antenna and the correction is successful; acquiring a second channel set according to the second group of correction signals looped back by the antenna, where the second channel set includes a service transmit channel on which the channel correction is performed by using the second group of correction signals looped back by the antenna and the correction is successful; and acquiring an intersection set of the first channel set and the second channel set, and acquiring, by using a correction coefficient corresponding to any service transmit channel in the intersection set, a correction coefficient of a service transmit channel corresponding to a correction signal whose signal quality is not reliable, so as to obtain correction coefficients of all service transmit channels. That is, the correction coefficient corresponding to any service transmit channel in the intersection set is used to acquire a corresponding correction coefficient that is of a transmit channel whose signal quality of a group of correction signals is not reliable and calculated by using another group of correction signals, so as to obtain the correction coefficients of all service transmit channels. It should be noted that if the calculating of the correction coefficient of each service transmit channel by using the acquired first group of correction signals looped back by the antenna and the acquired second group of correction signals looped back by the antenna is still not successful, a third group of correction signals looped back by the antenna and a fourth group of correction signals looped back by the antenna need to be acquired, and similar processing is performed until all service transmit channels can be corrected successfully. An example is used for description in the following. It is assumed that a standing wave detecting channel of a service transmit channel 0 is recorded as RX0, and correction signals of service transmit channels 0/1/2/3 may be received. If isolation between the service transmit channel 1 and the RX0 is very large, the RX0 may only implement correction of the transmit channels 0/2/3 and cannot implement correction of all four transmit channels. Herein, a set of the service transmit channels that complete the correction is recorded as R0CalibSet={0 2 3}, and respective correction coefficients are CalibCoefR0={Calib0Coef0 Calib0Coef2 Calib0Coef3}, because quality of a received signal of the transmit channel 1 is not reliable. In this case, a standing wave detecting channel of the service transmit channel 2 is recorded as RX2, and may also receive the correction signals of the service transmit channels 0/1/2/3, and a correction signal that is received by the RX2 and of the service transmit channel 3 is not reliable, and therefore, in the RX2, joint channel correction of the service transmit channels 0/1/2 may be implemented. A set of the service transmit channels that complete the correction is recorded as R2CalibSet={0 1 2} and respective correction coefficients are CalibCoefR 2={Calib2Coef 0 Calib2Coef 1 Calib2Coef 2}. In this case, correction of all transmit channels can be implemented only by performing the bridge operation on results of the standing wave detecting channels 0 and 2, and a bridge manner is as follows: The receive channels RX0 and RX2 use an intersection set in sets of transmit channels whose correction is implemented in the receive channels RX0 and RX2 as a bridge point to implement a union set of two sets of transmit channels whose correction is implemented. A specific operation is as follows: It is found that an intersection set 0 and an intersection set 1 exist in the two sets R0CalibSet and R2CalibSet and by using a correction coefficient corresponding to any service transmit channel in the intersection sets, a correction coefficient of a service transmit channel corresponding to a correction signal whose signal quality is not reliable is acquired, so as to obtain correction coefficients of all service transmit channels. For example, the service transmit channel 0 may be used as a reference to separately calculate a correction coefficient. If calculation is performed according to a correction coefficient of the transmit channel 0, that is, all correction coefficients in the standing wave detecting channel RX2 are calculated by using the correction coefficient of the service transmit channel 0 in the standing wave detecting channel RX0 as the reference, that is, all coefficients in the standing wave detecting channel RX2 are separately multiplied by a factor:

$$\frac{Calib0Coef0}{Calib2Coef0}$$

the correction coefficients in the receive channel 2 are changed to:

$$CalibCoefR\,2 = \{Calib\,0Coef\,0,\,Calib\,2Coef\,1 * \frac{Calib\,0Coef\,0}{Calib\,2Coef\,0},\,Calib\,2Coef\,2 * \frac{Calib\,0Coef\,0}{Calib\,2Coef\,0}\}$$

Therefore, a correction coefficient of the service transmit channel 1 is obtained, and correction coefficients of the four service transmit channels are respectively:

$$TxCalibCoef = \{Calib\,0Coef\,0,\,Calib\,2Coef\,1 * \frac{Calib\,0Coef\,0}{Calib\,2Coef\,0},\,Calib\,0Coef\,2,\,Calib\,0Coef\,3\}$$

In this case, joint correction of all service transmit channels is implemented.

Finally, it should be noted that: if a standing wave detecting channel does not exist in an existing RRU, a new combined RRU must have a standing wave detecting channel, and otherwise, a correction signal cannot be looped back to the BBU. That is, for an RRU combined by two RRUs or more RRUs, at least one RRU must have a standing wave detecting channel, and only in this case, the channel correction can be implemented. In this case, for a 2T2R RRU, the RRU that has the standing wave detecting channel separately passes, according to a time sequence, two correction signals that are received by an antenna and of the transmit channel through the standing wave detecting channel. In this way, the BBU also receives two correction signals. A bridge procedure of the two correction signals after a delay difference is separately obtained by calculation is consistent with the foregoing described bridge procedure.

When the RRU connected to the BBU has only one standing wave detecting channel, the BBU needs to send correction signals twice. When the correction signals are sent for the first time, the standing wave detecting channel receives first correction signals received by an antenna, these are a first group of received correction signals; and when the correction signals are sent for the second time, the standing wave detecting channel receives second correction signals received by an antenna, these are a second group of received correction signals. Both the two groups of received correction signals include four correction signals. That is, each group of received correction signals include correction signals of the four transmit channels.

In another possible implementation manner, the baseband unit BBU has a communication connection to at least two remote radio units, where at least one remote radio unit of the at least two remote radio units has a standing wave detecting channel. That is, the baseband unit BBU is applied to the base station shown in FIG. 3.

Figure 9:
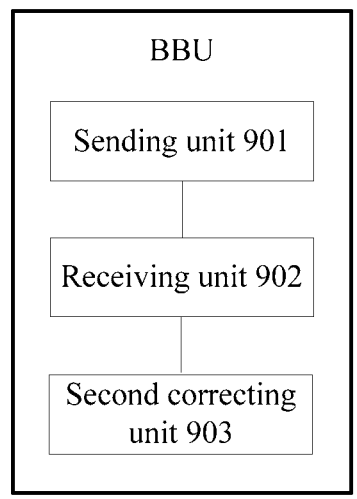
FIG. 9 is a schematic diagram of a second embodiment of a baseband unit BBU according to an embodiment of the present disclosure.

FIG. 9 is a schematic diagram of a second embodiment of a baseband unit BBU according to an embodiment of the present disclosure.

In an implementation process of the present disclosure, the inventor finds that for a reason, quality of a received signal of a transmit channel may be not reliable. Through research, the inventor finds that a reason may include that: Because a current signal that is received by a standing wave detecting channel and of a service transmit channel corresponding to the standing wave detecting channel (that is, a correction signal transmitted by the service transmit channel corresponding to the standing wave detecting channel) may be a reflected signal that passes through an interface between an RRU and a radio frequency cable or an interface between a radio frequency cable and an antenna, in this case, the signal does not transmit through the radio frequency cable or does not transmit through an air interface between the antenna and the antenna, and therefore, if the signal is used as a useful signal for transmission, an error of the delay difference obtained by calculation may become bigger, thereby causing deterioration of system performance.

Through research, the inventor finds that another reason may include that: Because of isolation between antennas, quality of a correction signal is not reliable. The correction signal transmitted between antennas generally fades by 30-50 db and even up to 70-80 db, and therefore, after radio frequency filtering sampling processing is performed, a correction signal received by using an antenna may become very weak and even is completely lower than noise power. In this case, quality of a correction signal received by the antenna is very poor, so that calculation of a correction coefficient is not accurate. Therefore, a bridge operation needs to be used to implement joint channel correction of all transmit ends.

A baseband unit BBU is provided, where the baseband unit BBU is applied to a base station, the baseband unit BBU has a communication connection to at least one remote radio unit, and the at least one remote radio unit has a service transmit channel and at least one correction signal receive channel; and the baseband unit BBU includes:

a sending unit 901, configured to send a correction signal to the remote radio unit RRU that has the communication connection to the baseband unit BBU;

a receiving unit 902, configured to receive a correction signal that is transmitted over each service transmit channel of the remote radio unit RRU, looped back by an antenna, and fed by the correction signal receive channel; and a second correcting unit 903, configured to: according to the correction signal that is transmitted over each service transmit channel of the remote radio unit RRU, looped back by the antenna, and received by the receiving unit, and when it is determined that quality of a first group of correction signals that are looped back by the antenna and received by the receiving unit is not reliable, acquire a second group of correction signals looped back by the antenna, and calculate a correction coefficient of each service transmit channel by using the acquired first group of correction signals looped back by the antenna and the acquired second group of correction signals looped back by the antenna, so as to perform channel correction on each service transmit channel.

In specific implementation, when the second correcting unit determines that the quality of the first group of correction signals that are looped back by the antenna and received by the receiving unit is not reliable, the second group of correction signals looped back by the antenna are acquired, and the correction coefficient of each service transmit channel is calculated by using the acquired first group of correction signals looped back by the antenna and the acquired second group of correction signals looped back by the antenna, so as to perform the channel correction on each service transmit channel. For specific implementation, refer to the principle introduced in the embodiment shown in FIG. 8. A specific correction implementation process may be implemented by referring to the steps introduced in the foregoing embodiment, which is not described herein again.

It should be noted that, the baseband unit in this embodiment of the present disclosure may be applied to multiple application scenarios. The following introduces several possible application scenarios. A base station shown in FIG. 14 is applied to a frequency division duplex transmission mode, and the correction signal receive channel included in the remote radio unit that has a communication connection to the baseband unit BBU is a standing wave detecting channel; a base station shown in FIG. 15 is applied to a frequency division duplex transmission mode, and the correction signal receive channel included in the remote radio unit that has a communication connection to the baseband unit BBU is a specifically set correction receive channel, where the correction receive channel is different from a service receive channel, and a service transmit channel is also different from the standing wave detecting channel; and a base station shown in FIG. 16 is applied to a time division duplex transmission mode, and the correction signal receive channel included in the remote radio unit that has a communication connection to the baseband unit BBU is the service receive channel, which are described in detail in the following.

Figure 14:
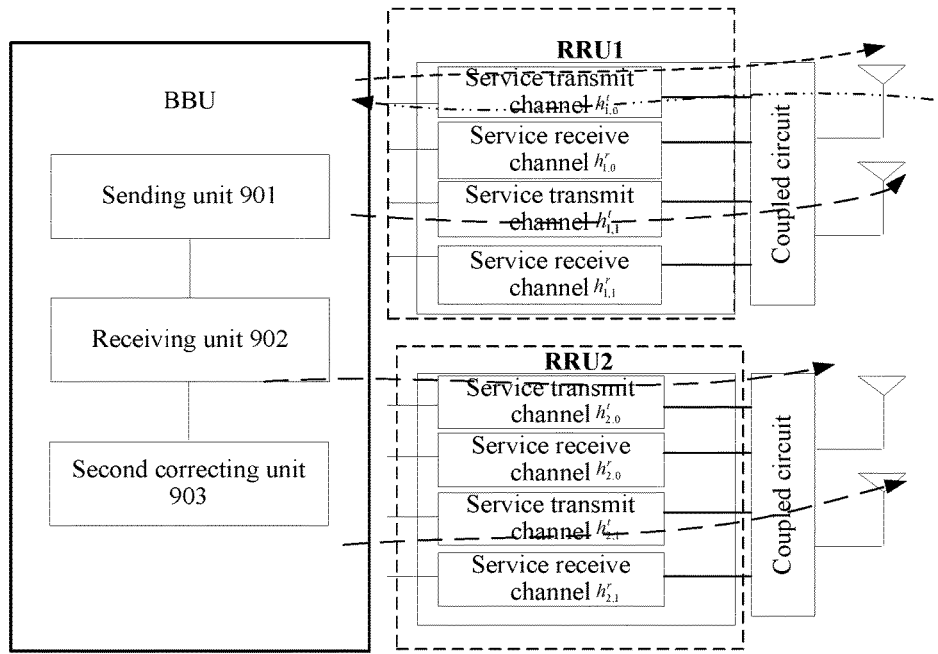
FIG. 14 is a schematic diagram of a fourth embodiment of a base station according to an embodiment of the present disclosure.

As shown in FIG. 14, FIG. 14 is a schematic diagram of a fourth embodiment of a base station according to an embodiment of the present disclosure. In FIG. 14, the base station includes the baseband unit BBU shown in FIG. 9, the BBU may be connected to at least one remote radio unit RRU, the shown RRU has at least one standing wave detecting channel (corresponding to a correction signal receive channel), and a working frequency of the standing wave detecting channel is the same as a working frequency of a service transmit channel of the remote radio unit RRU. The standing wave detecting channel is configured to receive a correction signal looped back by an antenna, and send, to the baseband unit BBU, the correction signal looped back by the antenna, so that the baseband unit BBU calculates a correction coefficient of each service transmit channel according to the correction signal looped back by the antenna and performs channel correction on each service transmit channel, where the correction signal looped back by the antenna includes at least a correction signal that is transmitted over each service transmit channel of the first remote radio unit RRU and looped back by the antenna. In a possible implementation manner, the remote radio unit that has a communication connection to the baseband unit BBU has at least one standing wave detecting channel, where the working frequency channel of the standing wave detecting channel is the same as the working frequency of the service transmit channel of the remote radio unit RRU, and the receiving unit 902 is configured to: receive the correction signal that is transmitted over each service transmit channel of the remote radio unit RRU, looped back by the antenna, and fed by the standing wave detecting channel.

Figure 15:
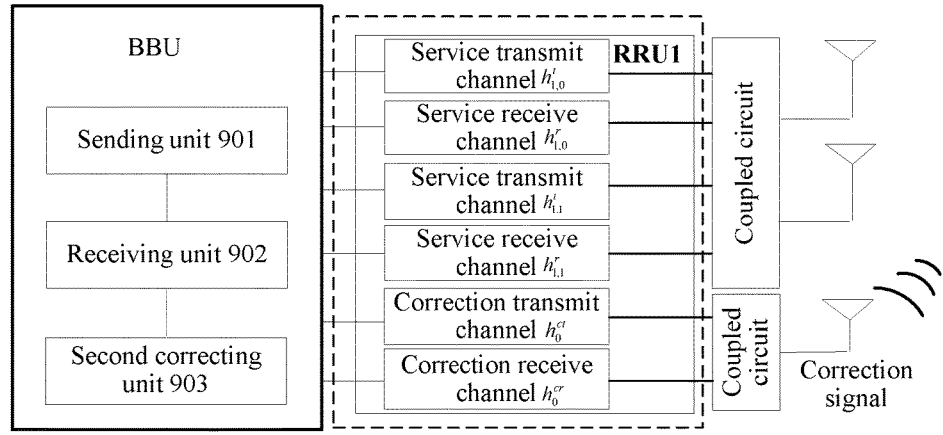
FIG. 15 is a schematic diagram of a fifth embodiment of a base station according to an embodiment of the present disclosure.
Figure 16:
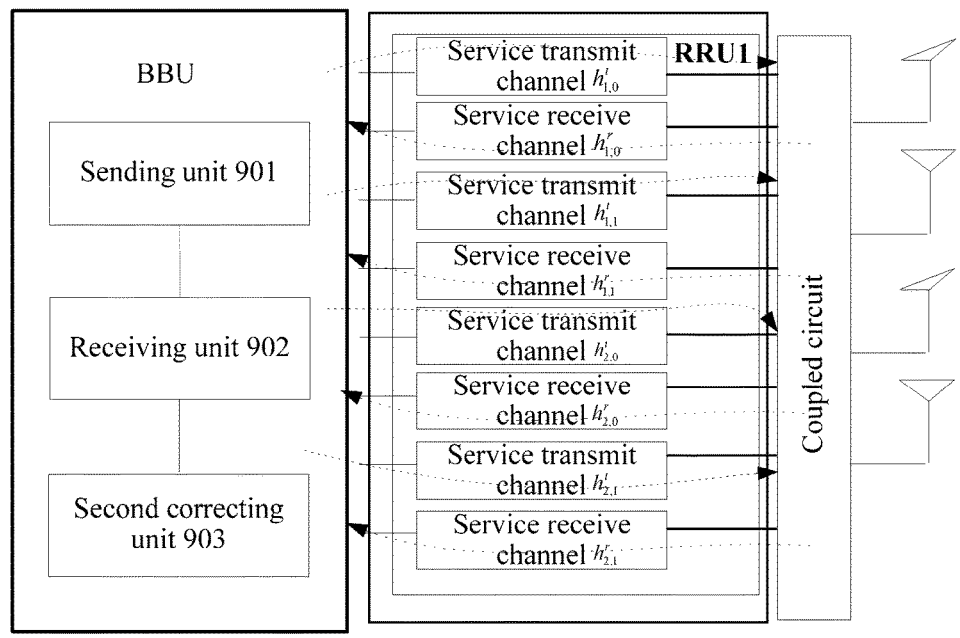
FIG. 16 is a schematic diagram of a sixth embodiment of a base station according to an embodiment of the present disclosure.

Referring to FIG. 15, FIG. 15 is a schematic diagram of a fifth embodiment of a base station according to an embodiment of the present disclosure. In FIG. 15, the base station includes the baseband unit BBU shown in FIG. 9, the BBU may be connected to at least one remote radio unit RRU, and at least one RRU in the shown RRU has at least one correction receive channel (corresponding to a correction signal receive channel), where a working frequency of the correction receive channel is the same as a working frequency of a service transmit channel of the remote radio unit RRU, and the correction receive channel is configured to receive a correction signal that is sent over each service transmit channel of the RRU and looped back by an antenna.

In a possible implementation manner, the remote radio unit that has a communication connection to the baseband unit BBU has at least one correction receive channel, where the working frequency of the correction receive channel is the same as the working frequency of the service transmit channel of the remote radio unit RRU, the correction receive channel is different from a service receive channel, and the receiving unit 902 is configured to: receive the correction signal that is transmitted over each service transmit channel of the remote radio unit RRU, looped back by the antenna, and fed by the correction receive channel.

FIG. 16 is a schematic diagram of a sixth embodiment of a base station according to an embodiment of the present disclosure. It should be noted that the shown base station may be applied to a TDD system. In FIG. 15, the base station includes the baseband unit BBU shown in FIG. 9, the BBU may be connected to at least one remote radio unit RRU, and the shown RRU includes a service transmit channel and a service receive channel (corresponding to a correction signal receive channel), where the shown service transmit channel is configured to send a correction signal, and the service receive channel is configured to receive a correction signal that is sent over each service transmit channel of the RRU and looped back by an antenna.

Specifically, in a possible implementation manner, the remote radio unit that has a communication connection to the baseband unit BBU has at least two service receive channels, and the receiving unit 902 is configured to: receive the correction signal that is transmitted over each service transmit channel of the remote radio unit RRU, looped back by the antenna, and fed by the service receive channel. In this implementation manner, the BBU shown in FIG. 9 may also be applied to the TDD system.

FIG. 10 is a schematic diagram of a third embodiment of a baseband unit BBU according to an embodiment of the present disclosure.

According to another aspect of this embodiment of the present disclosure, this embodiment of the present disclosure further provides a baseband unit BBU, where the baseband unit BBU includes at least one processor 1001 (such as a CPU), a memory 1002, and at least one communications bus 1003 that is configured to implement connection and communication between these apparatuses. The processor 1001 is configured to execute an executable module, such as a computer program, stored in the memory 1002. The memory 1002 may include a high-speed random access memory (RAM: Random Access Memory), and may also include a non-volatile memory (non-volatile memory), such as at least one disk memory.

In some implementation manners, the memory 1002 stores a program 10021, where the program 10021 may be executed by the processor 1001 and this program includes: sending a correction signal to the remote radio unit RRU that has the communication connection to the baseband unit BBU; receiving a correction signal that is transmitted over each service transmit channel of the remote radio unit RRU, looped back by an antenna, and fed by a standing wave detecting channel of the remote radio unit RRU; and calculating a correction coefficient of each service transmit channel according to the received correction signal that is transmitted over each service transmit channel of the remote radio unit RRU and looped back by the antenna, and separately performing channel correction on each service transmit channel.

The program 10021 may further include: when it is determined that quality of a first group of received correction signals looped back by the antenna is not reliable, acquiring a second group of correction signals looped back by the antenna, and calculating the correction coefficient of each service transmit channel by using the acquired first group of correction signals looped back by the antenna and the acquired second group of correction signals looped back by the antenna, so as to perform the channel correction on each service transmit channel.

The program 10021 may further include: when the remote radio unit connected to the baseband unit BBU has only one standing wave detecting channel, and when it is determined that quality of a first group of correction signals that are looped back by the antenna and received by a receiving unit is not reliable, sending a second group of correction signals to the remote radio unit RRU that has the communication connection to the baseband unit BBU; and acquiring a second group of received correction signals that are sent in the remote radio unit RRU and looped back by the antenna, and using the second group of received correction signals as the second group of correction signals looped back by the antenna.

The program 10021 may further include: acquiring a first correction coefficient set according to the first group of correction signals looped back by the antenna; acquiring a second correction coefficient set according to the second group of correction signals looped back by the antenna; acquiring an intersection set of the first correction coefficient set and the second correction coefficient set, acquiring, by using a correction coefficient corresponding to any service transmit channel in the intersection set, a correction coefficient of a service transmit channel corresponding to a correction signal whose signal quality is not reliable, so as to obtain correction coefficients of all service transmit channels, and performing the channel correction on each service transmit channel by using the obtained correction coefficients of all service transmit channels.

The program 10021 may further include: performing channel estimation on each service transmit channel according to the received correction signal that is transmitted over each service transmit channel of the remote radio unit RRU and looped back by the antenna to obtain a channel response value of each service transmit channel;

obtaining a delay difference between each service transmit channel and a reference transmit channel according to the channel response value of each service transmit channel, where the reference transmit channel is one service transmit channel of all service transmit channels; and obtaining a correction coefficient by using the obtained delay difference, and obtaining a channel response value of each compensated service transmit channel by using the correction coefficient, so as to perform channel compensation.

The program 10021 may further include: obtaining a phase difference between each service transmit channel and the reference transmit channel by using the channel response value of each service transmit channel, and obtaining the delay difference between each service transmit channel and the reference transmit channel by using the acquired phase difference; or transforming the channel response value of each service transmit channel to a time domain, and separately obtaining a time domain sample point corresponding to a maximum modulus value of the response value of each service transmit channel and using the time domain sample point as a delay of the service transmit channel, so as to obtain the delay difference between each service transmit channel and the reference transmit channel.

FIG. 11 is a schematic diagram of a first embodiment of a method for correcting a channel of a remote radio unit according to an embodiment of the present disclosure.

A method for correcting a channel of a remote radio unit is applied to a first remote radio unit RRU, where the first remote radio unit RRU has a communication connection to a baseband unit BBU, the first remote radio unit RRU includes a service transmit channel and a standing wave detecting channel, a working frequency of the service transmit channel is the same as a working frequency of the standing wave detecting channel, and the method includes:

S1101. Each service transmit channel of the first remote radio unit RRU transmits a correction signal, where the correction signal is sent by the baseband unit BBU to the first remote radio unit RRU.

S1102. A standing wave detecting channel of the first remote radio unit RRU receives a correction signal looped back by an antenna, and sends, to the baseband unit BBU, the correction signal looped back by the antenna, so that the baseband unit BBU calculates a correction coefficient of each service transmit channel according to the correction signal looped back by the antenna and separately performs channel correction on each service transmit channel, where the correction signal looped back by the antenna includes at least a correction signal that is transmitted over each service transmit channel of the first remote radio unit RRU and looped back by the antenna.

Further, the baseband unit BBU also has a communication connection to a second remote radio unit RRU, and the second remote radio unit RRU includes a service transmit channel, where the service transmit channel is configured to transmit a correction signal, and the correction signal is sent by the baseband unit BBU to the second remote radio unit RRU; and that the standing wave detecting channel of the first remote radio unit RRU receives a correction signal looped back by an antenna, and sends, to the baseband unit BBU, the correction signal looped back by the antenna, so that the baseband unit BBU calculates a correction coefficient of each service transmit channel according to the correction signal looped back by the antenna and separately performs channel correction on each service transmit channel is specifically:

the standing wave detecting channel of the first remote radio unit RRU receives a correction signal that is transmitted over each service transmit channel of the first remote radio unit RRU and looped back by the antenna and a correction signal that is transmitted over each service transmit channel of the second remote radio unit RRU and looped back by the antenna, and sends, to the baseband unit BBU, the correction signal that is transmitted over each service transmit channel of the first remote radio unit RRU and looped back by the antenna and the correction signal that is transmitted over each service transmit channel of the second remote radio unit RRU and looped back by the antenna, so that the baseband unit BBU calculates the correction coefficient of each service transmit channel according to the correction signal that is transmitted over each service transmit channel of the second remote radio unit RRU and looped back by the antenna and the correction signal that is transmitted over each service transmit channel of the first remote radio unit RRU and looped back by the antenna, and separately performs the channel correction on each service transmit channel.

Figure 12:
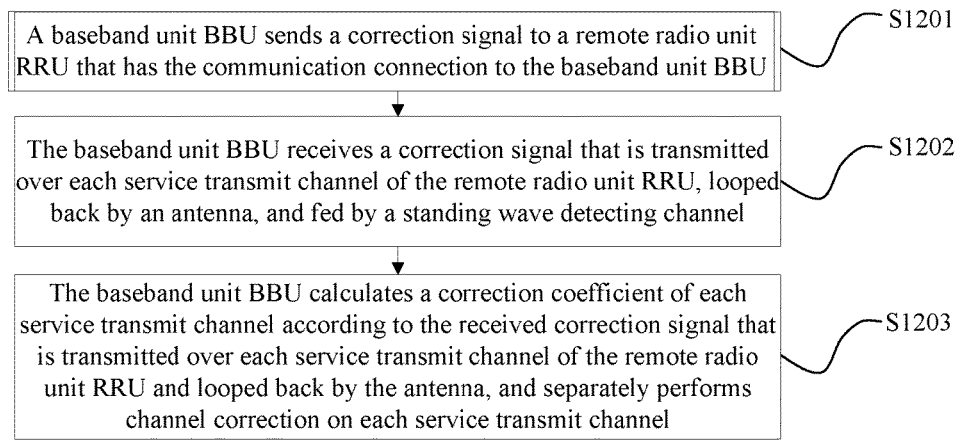
FIG. 12 is a schematic diagram of a second embodiment of a method for correcting a channel of a remote radio unit according to an embodiment of the present disclosure.

FIG. 12 is a schematic diagram of a second embodiment of a method for correcting a channel of a remote radio unit according to an embodiment of the present disclosure.

A method for correcting a channel of a remote radio unit is applied to a baseband unit BBU, where the baseband unit BBU has a communication connection to at least one remote radio unit, the at least one remote radio unit has a standing wave detecting channel and a service transmit channel, a working frequency of the standing wave detecting channel is the same as a working frequency of the service transmit channel, and the method includes:

S1201. The baseband unit BBU sends a correction signal to a remote radio unit RRU that has a communication connection to the baseband unit BBU.

S1202. The baseband unit BBU receives a correction signal that is transmitted over each service transmit channel of the remote radio unit RRU, looped back by an antenna, and fed by the standing wave detecting channel.

S1203. The baseband unit BBU calculates a correction coefficient of each service transmit channel according to the received correction signal that is transmitted over each service transmit channel of the remote radio unit RRU and looped back by the antenna, and separately performs channel correction on each service transmit channel.

Further, the baseband unit BBU has a communication connection to at least two remote radio units, where at least one remote radio unit of the at least two remote radio units has a standing wave detecting channel.

Further, the method further includes:

when it is determined that quality of a first group of received correction signals looped back by the antenna is not reliable, acquiring a second group of correction signals looped back by the antenna, and calculating the correction coefficient of each service transmit channel by using the acquired first group of correction signals looped back by the antenna and the acquired second group of correction signals looped back by the antenna, so as to perform the channel correction on each service transmit channel.

Further, when the remote radio unit connected to the baseband unit BBU has only one standing wave detecting channel, the method further includes:

when it is determined that quality of a first group of correction signals that are looped back by the antenna and received by a receiving unit is not reliable, sending a second group of correction signals to the remote radio unit RRU that has the communication connection to the baseband unit BBU; and the acquiring a second group of correction signals looped back by the antenna includes:

acquiring the second group of received correction signals that are sent in the remote radio unit RRU and looped back by the antenna, and using the second group of received correction signals as the second group of correction signals looped back by the antenna.

Further, the calculating the correction coefficient of each service transmit channel by using the acquired first group of correction signals looped back by the antenna and the acquired second group of correction signals looped back by the antenna includes:

acquiring a first channel set according to the first group of correction signals looped back by the antenna, where the first channel set includes a service transmit channel on which the channel correction is performed by using the first group of correction signals looped back by the antenna and the correction is successful; acquiring a second channel set according to the second group of correction signals looped back by the antenna, where the second channel set includes a service transmit channel on which the channel correction is performed by using the second group of correction signals looped back by the antenna and the correction is successful; and acquiring an intersection set of the first channel set and the second channel set, acquiring, by using a correction coefficient corresponding to any service transmit channel in the intersection set, a correction coefficient of a service transmit channel corresponding to a correction signal whose signal quality is not reliable, so as to obtain correction coefficients of all service transmit channels, and performing the channel correction on each service transmit channel by using the obtained correction coefficients of all service transmit channels.

Further, the calculating a correction coefficient of each service transmit channel according to the received correction signal that is transmitted over each service transmit channel of the remote radio unit RRU and looped back by the antenna, and separately performing channel correction on each service transmit channel includes:

performing channel estimation on each service transmit channel according to the received correction signal that is transmitted over each service transmit channel of the remote radio unit RRU and looped back by the antenna to obtain a channel response value of each service transmit channel;

obtaining a delay difference between each service transmit channel and a reference transmit channel according to the channel response value of each service transmit channel, where the reference transmit channel is one service transmit channel of all service transmit channels; and obtaining a correction coefficient by using the obtained delay difference, and performing channel compensation on each service transmit channel by using the correction coefficient.

Further, the obtaining a delay difference between each service transmit channel and a reference transmit channel according to the channel response value of each service transmit channel includes:

obtaining a phase difference between each service transmit channel and the reference transmit channel by using the channel response value of each service transmit channel, and obtaining the delay difference between each service transmit channel and the reference transmit channel by using the acquired phase difference;

or transforming the channel response value of each service transmit channel to a time domain, and separately obtaining a time domain sample point corresponding to a maximum modulus value of the response value of each service transmit channel and using the time domain sample point as a delay of the service transmit channel, so as to obtain the delay difference between each service transmit channel and the reference transmit channel.

Figure 13:
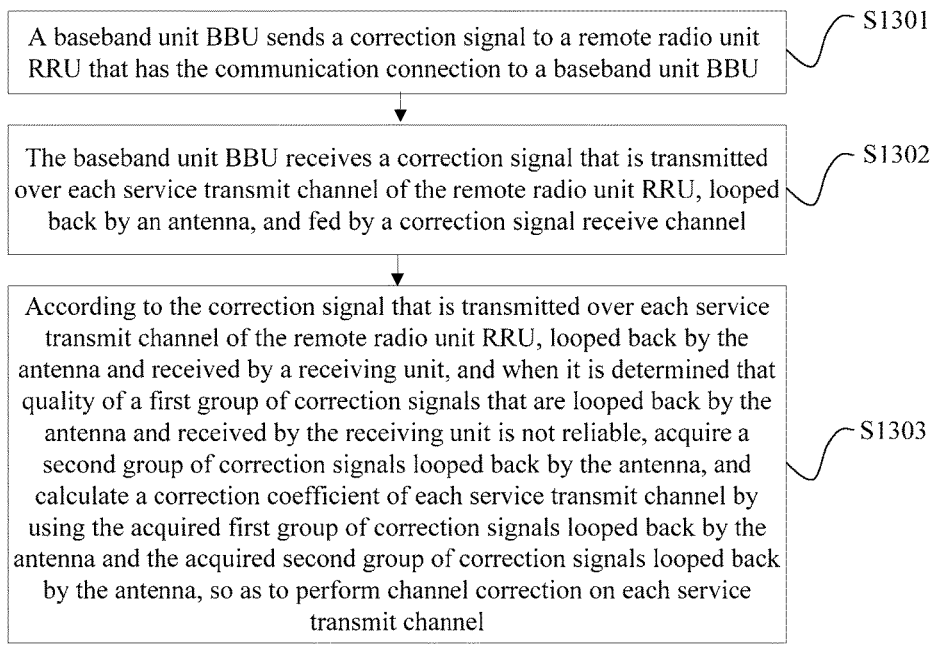
FIG. 13 is a schematic diagram of a third embodiment of a method for correcting a channel of a remote radio unit according to an embodiment of the present disclosure.

FIG. 13 is a schematic diagram of a third embodiment of a method for correcting a channel of a remote radio unit according to an embodiment of the present disclosure.

A method for correcting a channel of a remote radio unit is applied to a baseband unit BBU, where the baseband unit BBU is applied to a base station, the baseband unit BBU has a communication connection to at least one remote radio unit, the at least one remote radio unit has a service transmit channel and a correction signal receive channel, and the method includes:

S1301. Send a correction signal to a remote radio unit RRU that has the communication connection to the baseband unit BBU.

S1302. Receive a correction signal that is transmitted over each service transmit channel of the remote radio unit RRU, looped back by an antenna, and fed by the correction signal receive channel.

S1303. According to the correction signal that is transmitted over each service transmit channel of the remote radio unit RRU, looped back by the antenna and received by a receiving unit, and when it is determined that quality of a first group of correction signals that are looped back by the antenna and received by the receiving unit is not reliable, acquire a second group of correction signals looped back by the antenna, and calculate a correction coefficient of each service transmit channel by using the acquired first group of correction signals looped back by the antenna and the acquired second group of correction signals looped back by the antenna, so as to perform channel correction on each service transmit channel.

Further, when the baseband unit BBU is applied to a frequency division duplex transmission mode, the correction signal receive channel included in the remote radio unit that has a communication connection to the baseband unit BBU is a standing wave detecting channel, the remote radio unit has at least one standing wave detecting channel, a working frequency of the standing wave detecting channel is the same as a working frequency of the service transmit channel of the remote radio unit RRU, and the receiving a correction signal that is transmitted over each service transmit channel of the remote radio unit RRU, looped back by an antenna, and fed by the correction signal receive channel includes:

receiving a correction signal that is transmitted over each service transmit channel of the remote radio unit RRU, looped back by the antenna, and fed by the standing wave detecting channel. The foregoing method embodiment may be applied to the base station shown in FIG. 14.

Further, when the baseband unit BBU is applied to a frequency division duplex transmission mode, the correction signal receive channel included in the remote radio unit that has a communication connection to the baseband unit BBU is a correction receive channel, the remote radio unit has at least one correction receive channel, a working frequency of the correction receive channel is the same as a working frequency of the service transmit channel of the remote radio unit RRU, the correction receive channel is different from a service receive channel, and the receiving a correction signal that is transmitted over each service transmit channel of the remote radio unit RRU, looped back by an antenna, and fed by the correction signal receive channel includes: receiving a correction signal that is transmitted over each service transmit channel of the remote radio unit RRU, looped back by the antenna, and fed by the correction receive channel. The foregoing method embodiment may be applied to the base station shown in FIG. 15.

Further, when the baseband unit BBU is applied to a time division duplex transmission mode, the correction signal receive channel included in the remote radio unit that has a communication connection to the baseband unit BBU is a service receive channel, the remote radio unit has the service receive channel, and the receiving a correction signal that is transmitted over each service transmit channel of the remote radio unit RRU, looped back by an antenna, and fed by the correction signal receive channel includes: receiving a correction signal that is transmitted over each service transmit channel of the remote radio unit RRU, looped back by the antenna, and fed by the service receive channel. The foregoing method embodiment may be applied to the base station shown in FIG. 16.

It should be noted that because the apparatus embodiments are described in detail, description of method embodiments is simpler. A person skilled in the art can understand that, to implement the method embodiments of the present disclosure, reference may be made to the specific implementation principles of the apparatus embodiments. Other implementation manners obtained by a person skilled in the art without creative efforts shall fall within the protection scope of the present disclosure.

It should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the presence of additional identical elements in the process, method, article, or device that includes the element.

Embodiments of the present disclosure can be described in the general context of executable computer instructions executed by a computer, for example, a program module. Generally, the program unit includes a routine, program, object, component, data structure, and the like for executing a particular task or implementing a particular abstract data type. Embodiments of the present disclosure may also be practiced in distributed computing environments in which tasks are performed by remote processing devices that are connected through a communications network. In a distributed computing environment, program modules may be located in both local and remote computer storage media including storage devices.

The embodiments in this specification are all described in a progressive manner, for same or similar parts in the embodiments, reference may be made to these embodiments, and each embodiment focuses on a difference from other embodiments. Especially, an apparatus embodiment is basically similar to a method embodiment, and therefore is described briefly; for related parts, reference may be made to partial descriptions in the method embodiment. The described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present disclosure without creative efforts.

The foregoing descriptions are merely specific implementation manners of the present disclosure. It should be noted that a person of ordinary skill in the art may make several improvements or polishing without departing from the principle of the present disclosure and the improvements or polishing shall fall within the protection scope of the present disclosure.

What is claimed is:

1. A remote radio unit (RRU) connected to a baseband unit (BBU), the RRU comprising:
   a plurality of service transmit channels connected to an antenna configured to each transmit a correction signal received from the BBU; and
   a standing wave detecting circuit associated with the service transmit channels, wherein the standing wave detecting circuit (a) has a working frequency that is the same as a working frequency of one of the service transmit channels, and (b) is configured to:
      receive a portion of a correction signal transmitted by each of the service transmit channels and reflected by the antenna,
      send the portions of the correction signals to the BBU, and
      obtain delay differences between each of the reflected portions of the correction signals on the plurality of service transmit channels and a reflected portion of the correction signal on a reference transmit channel,
   wherein the delay differences are used to determine a correction coefficient of the service transmit channels for implementing delay consistency among the service transmit channels.

2. The RRU according to claim 1, wherein the plurality of service transmit channels comprises:
   a first service transmit channel and a second service transmit channel, and the portion of the correction signal transmitted by the antenna is connected to the first service transmit channel and then received by another antenna connected to the second service transmit channel.

3. The RRU according to claim 2, wherein the standing wave detecting circuit comprises a bilateral switch configured to implement a connection or disconnection between the standing wave detecting circuit and one of the first and second service transmit channels.

4. A baseband unit (BBU) connected to a first remote radio unit (RRU), the BBU comprising:
   a transmitter configured to send a first correction signal to the first RRU;
   a receiver configured to receive a portion of the first correction signal from the first RRU derived from the first correction signal looped back by an antenna at the BBU before being transmitted by the first BBU for each of a plurality of service transmit channels,
   wherein the portion of the first correction signal (a) is based on a reflection of the first correction signal at the first RRU and (b) includes delay differences between the portion of the first correction signal on each of the plurality of service transmit channels and a reflected portion of the first correction signal on a reference transmit channel; and
   a processor configured to determine a correction coefficient for the service transmit channels according to the delay differences for implementing delay consistency among the service transmit channels.

5. The BBU according to claim 4, wherein the BBU is further connected to a second RRU, and wherein:
   the transmitter is further configured to send a second correction signal to the second RRU; and
   the portion of the first correction signal further comprises a portion of the second correction signal transmitted by a service transmit channel of the second RRU and received by the antenna connected to the first RRU.

6. The BBU according to claim 4, wherein:
   the transmitter is further configured to send a second correction signal to the first RRU; and
   the portion of the first correction signal comprises a portion of the second correction signal transmitted by a service transmit channel of the first RRU and reflected by the antenna connected to the first RRU.

7. The BBU according to claim 4, wherein the processor is further configured to:
   perform channel estimation on each of the plurality of service transmit channels according to the portion of the first correction signal to obtain a channel response value of each service transmit channel;
   obtain a delay difference between each of the plurality of service transmit channels and a reference transmit channel according to the channel response value of each service transmit channel, wherein the reference transmit channel is one service transmit channel of all service transmit channels; and
   obtain a correction coefficient by using the obtained delay difference; and
   perform channel compensation on each service transmit channel by using the correction coefficient.

8. The BBU according to claim 7, wherein the processor is further configured to:
   obtain a phase difference between each service transmit channel and the reference transmit channel by using the channel response value of each service transmit channel; and
   obtain the delay difference between each service transmit channel and the reference transmit channel by using the acquired phase difference.

9. The BBU according to claim 7, wherein the processor is further configured to:
   transform the channel response value of each service transmit channel to a time domain, and separately obtain a time domain sample point corresponding to a maximum modulus value of the response value of each service transmit channel and use the time domain sample point as a delay of the service transmit channel, so as to obtain the delay difference between each service transmit channel and the reference transmit channel.

10. A communication system comprising a baseband unit (BBU) and a first remote radio unit (RRU) connected to the BBU, wherein:

the first RRU is configured to
- receive a first correction signal from the BBU,
- transmit on each of a plurality of service transmit channels the first correction signal through an antenna connected to the first RRU,
- receive a portion of the first correction signal reflected by the antenna, and
- send the portion of the first correction signal to the BBU;

the BBU is configured to
- send the first correction signal to the first RRU,
- receive the portion of the first correction signal from the first RRU, and
- determine a correction coefficient for the service transmit channels according to delay differences for implementing delay consistency among the service transmit channels, where the delay differences are determined from the portions of the first correction signal for all of the service transmit channels.

11. The communication system according to claim 10, further comprising a second RRU connected to the BBU, wherein:
the BBU is further configured to send a second correction signal to the second RRU, the second RRU is configured to receive the second correction signal from the BBU and transmit the first correction signal through an antenna connected to the second RRU, and the portion of the first correction signal comprises a portion of the second correction signal transmitted by a service transmit channel of the second RRU and received by the antenna connected to the first RRU.

12. The communication system according to claim 10, wherein:
the BBU is further configured to send a second correction signal to the first BBU, and the portion of the first correction signal comprises a portion of the second correction signal transmitted by a service transmit channel of the first RRU and reflected by the antenna connected to the first RRU.

13. The communication system according to claim 10, wherein the BBU is further configured to:
- perform channel estimation on each service transmit channel according to the portion of the first correction signal to obtain a channel response value of each service transmit channel;
- obtain a delay difference between each service transmit channel and a reference transmit channel according to the channel response value of each service transmit channel, wherein the reference transmit channel is one service transmit channel of all service transmit channels; and
- obtain a correction coefficient by using the obtained delay difference; and
- perform channel compensation on each service transmit channel by using the correction coefficient.

14. The communication system according to claim 13, wherein the BBU is further configured to:
- obtain a phase difference between each service transmit channel and the reference transmit channel by using the channel response value of each service transmit channel, and obtain the delay difference between each service transmit channel and the reference transmit channel by using the acquired phase difference.

15. The communication system according to claim 13, wherein the BBU is further configured to:
- transform the channel response value of each service transmit channel to a time domain, and separately obtain a time domain sample point corresponding to a maximum modulus value of the response value of each service transmit channel and use the time domain sample point as a delay of the service transmit channel, so as to obtain the delay difference between each service transmit channel and the reference transmit channel.

* * * * *

UNITED STATES PATENT AND TRADEMARK OFFICE
CERTIFICATE OF CORRECTION

PATENT NO. : 10,164,799 B2
APPLICATION NO. : 15/068502
DATED : December 25, 2018
INVENTOR(S) : Yi et al.

Page 1 of 1

It is certified that error appears in the above-identified patent and that said Letters Patent is hereby corrected as shown below:

In the Claims

Claim 4, Column 38, Line 1 "transmitted by the first BBU for each" should read -- transmitted by the first RRU for each --

Signed and Sealed this
Tenth Day of September, 2019

Andrei Iancu
*Director of the United States Patent and Trademark Office*